US006317672B1

(12) United States Patent
Kuramoto et al.

(10) Patent No.: US 6,317,672 B1
(45) Date of Patent: Nov. 13, 2001

(54) CONTROLLER FOR INFINITE SPEED RATIO TRANSMISSION

(75) Inventors: Hiroaki Kuramoto; Motoharu Nishio; Hiromasa Sakai; Yasushi Narita; Tatsuya Nagato; Manzaburou Abe, all of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/615,049

(22) Filed: Jul. 12, 2000

(30) Foreign Application Priority Data

Jul. 15, 1999 (JP) .................................................. 11-201345

(51) Int. Cl.⁷ .............................. G06F 17/00; G06F 19/00
(52) U.S. Cl. ................................. 701/51; 701/61; 701/67; 701/79; 474/11; 474/18; 477/46
(58) Field of Search ................................. 701/51, 54, 55, 701/61, 65, 67, 71, 83, 79; 477/46, 120; 474/11, 18, 28; 180/197

(56) References Cited

U.S. PATENT DOCUMENTS

| | | | |
|---|---|---|---|
| 4,610,183 | * | 9/1986 | Nobumoto et al. .................. 477/118 |
| 4,671,138 | * | 6/1987 | Nobumoto et al. .................... 701/65 |
| 5,231,898 | * | 8/1993 | Okura ...................................... 477/95 |
| 5,871,416 | * | 2/1999 | Sawada et al. ......................... 477/47 |
| 6,220,985 | * | 4/2001 | Okahara ................................ 447/46 |

FOREIGN PATENT DOCUMENTS 63-219956   9/1988  (JP) .

* cited by examiner

Primary Examiner—William A. Cuchlinski, Jr.
Assistant Examiner—Gertrude Arthur
(74) Attorney, Agent, or Firm—Foley & Lardner

(57) ABSTRACT

In an infinite speed ratio transmission comprising a continuously variable transmission (2), reduction gear unit (3) and planetary gear set (5), the speed ratio of the continuously variable transmission (2) is controlled by a step motor (36). A range selected by a selector lever (86) is detected by a sensor (84). When the selected range has changed from a stationary range to one of a forward motion range and a reverse motion range, a microprocessor (80) first drives the step motor (36) to a predetermined position (S48, S54). Subsequently, by driving the step motor (36) to an operating position corresponding to a geared neutral point at which the output rotation speed of the infinite speed ratio transmission is zero (S51, S52, S53, S57, S58, S59), the undesirable effects of hysteresis occurring in a relation between the operating position of the step motor (36) and the speed ratio of the continuously variable transmission (2) according to a torque shift of the continuously variable transmission (2) are avoided.

10 Claims, 24 Drawing Sheets

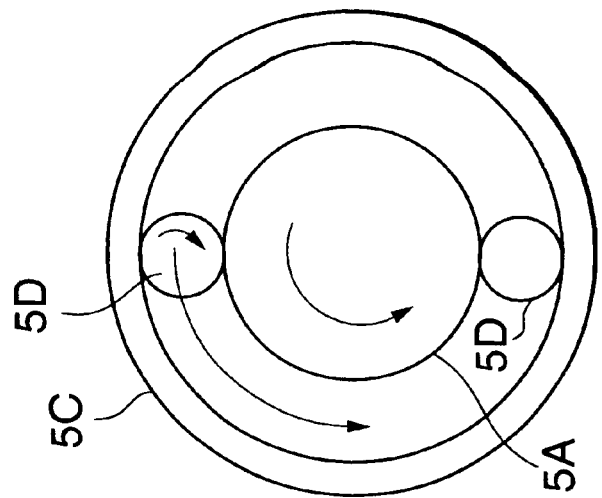
FIG. 7C GNP
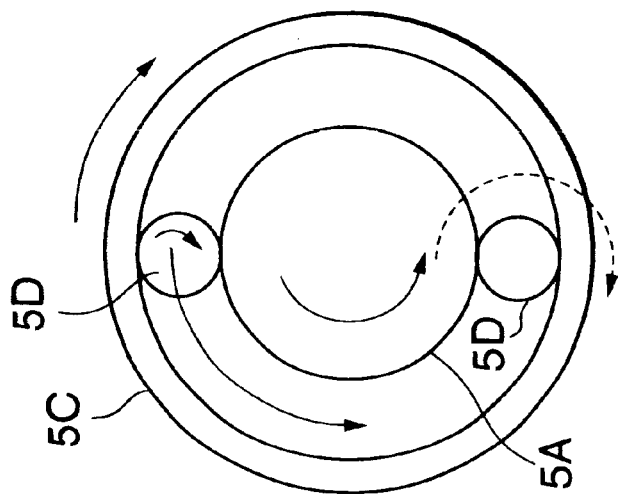
FIG. 7B REVERSE MOTION
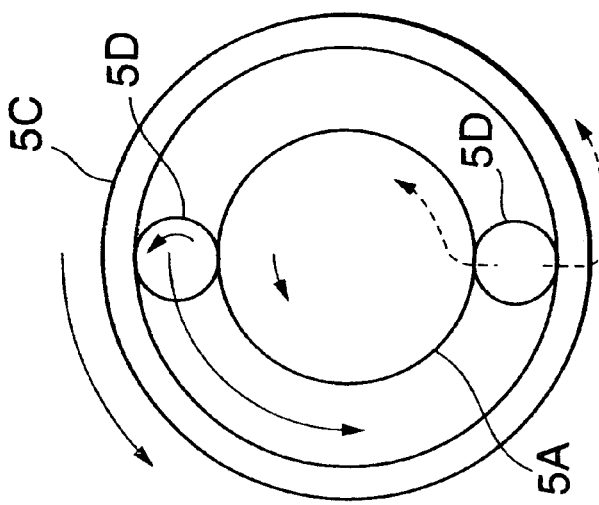
FIG. 7A FORWARD MOTION

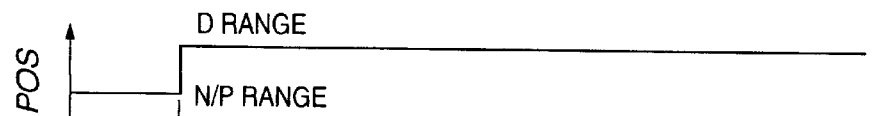
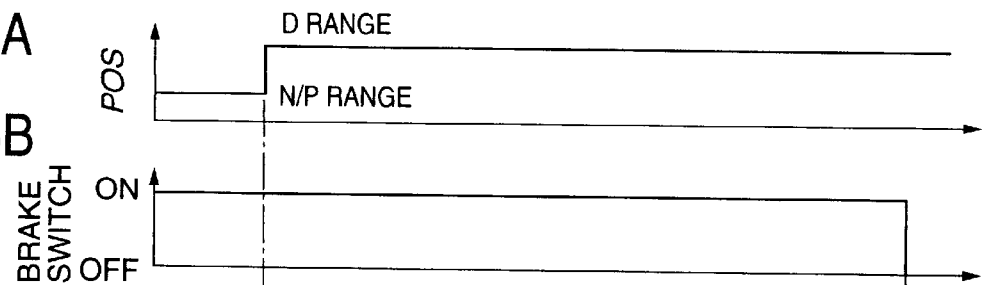
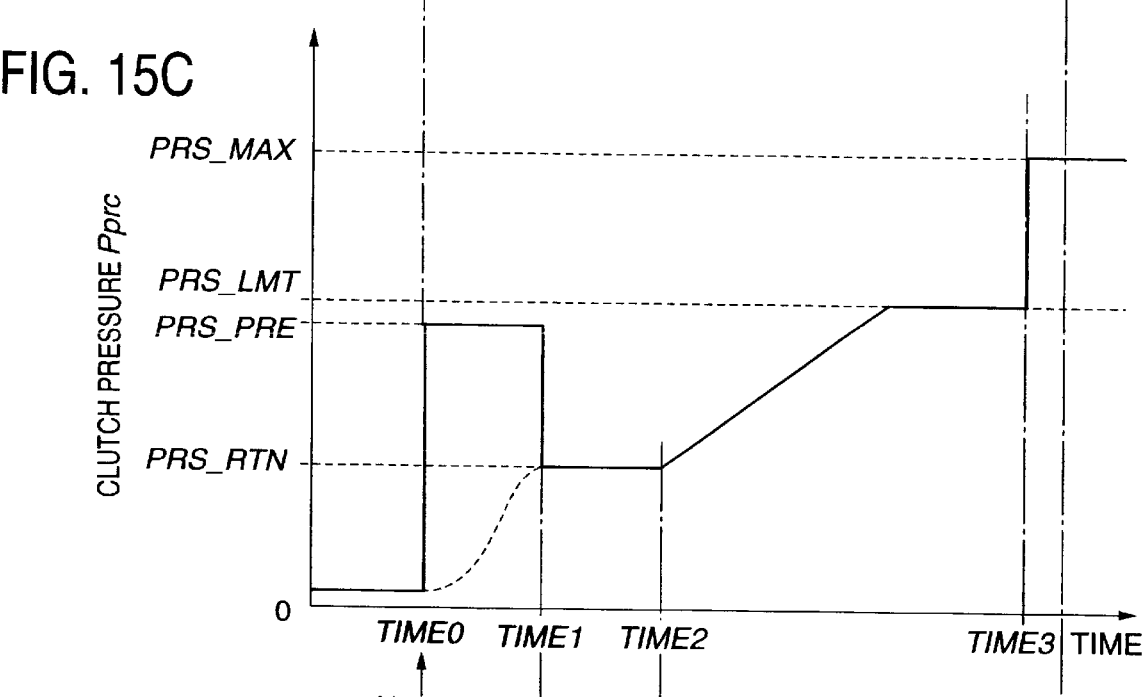
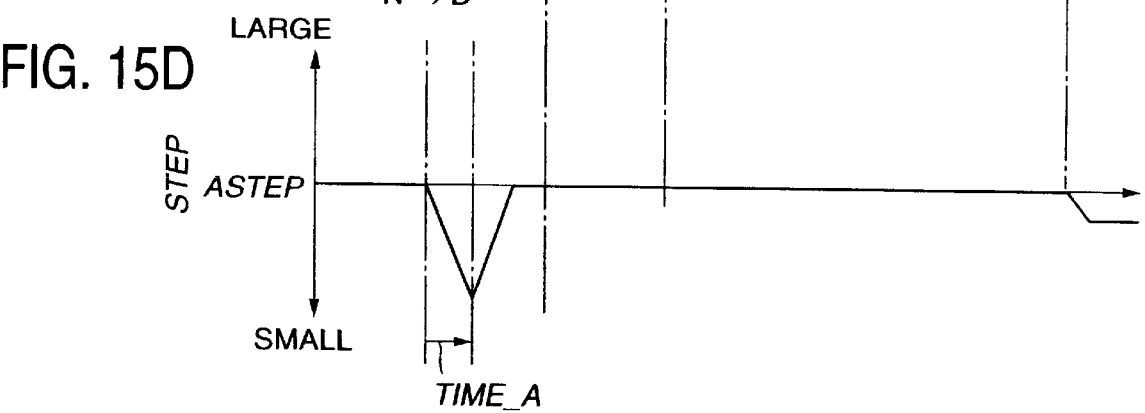

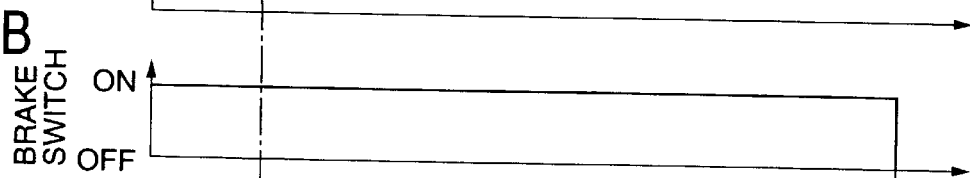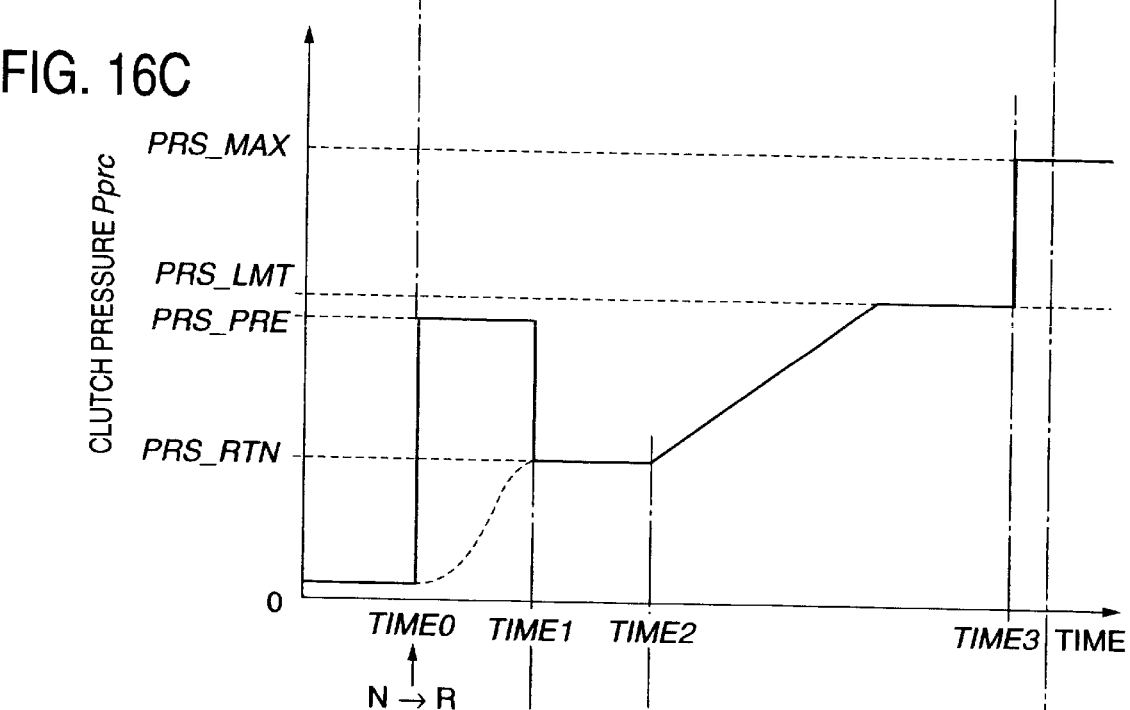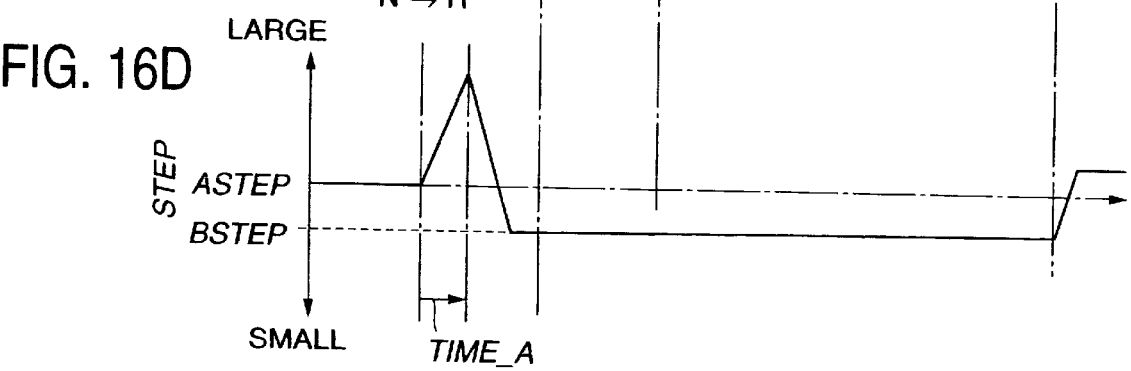

CONTROLLER FOR INFINITE SPEED RATIO TRANSMISSION

FIELD OF THE INVENTION

This invention relates to control of an infinite speed ratio transmission for vehicles.

BACKGROUND OF THE INVENTION

Tokkai Sho 63-219956 published by the Japanese Patent Office in 1988 discloses an infinite speed ratio transmission (referred to hereafter as IVT) which permits a speed ratio to be varied up to infinity by combining a reduction gear unit and planetary gear set with a toroidal continuously variable transmission (referred to hereafter as CVT).

The rotation of an engine is input to the CVT having a continuously variable speed ratio, and to the reduction gear unit which has a fixed speed ratio. The output shaft of the CVT is joined to a sun gear of the planetary gear set, and the rotation output of the reduction gear unit is joined to a planet carrier of the planetary gear set. A ring gear of the planetary gear set is joined to a final output shaft of the IVT. The planet carrier supports the center of plural planet gears held between the sun gear and ring gear.

An output shaft of the reduction gear unit and a planet carrier are joined via a power recirculation clutch. The output shaft of the CVT is also joined to the final output shaft via a direct clutch.

In a direct mode wherein the power recirculation clutch is disengaged and the direct clutch is engaged, the rotation of the CVT output shaft is directly output to the final output shaft, so the speed ratio li of the IVT is equal to a speed ratio lc of the CVT.

On the other hand, a power recirculation mode where the power recirculation clutch is engaged and the direct clutch is disengaged, the direction and speed of the output rotation of the final output shaft vary according to the difference between the speed ratio lc of the CVT and the speed ratio of the reduction gear unit. The speed ratio li of the IVT, i.e., the ratio of the rotation speed of the input shaft and the rotation speed of the final output shaft, varies from a negative value to a positive value. At the point where the rotation direction of the final output shaft changes, the speed ratio li of the IVT becomes infinite, and the final output shaft is stationary. This point is referred to as the geared neutral point (GNP).

SUMMARY OF THE INVENTION

When the IVT is used for the transmission device of a vehicle, at the geared neutral point GNP, the vehicle remains at rest. If the CVT speed ratio lc is increased from the GNP, the vehicle moves forward, and if it is decreased, the vehicle reverses. Therefore, the IVT does not require a torque converter as was required in prior art automatic transmissions. At the GNP, the transmission torque of the CVT is 0.

A toroidal CVT varies the speed ratio according to a gyration angle of power rollers gripped between an input disk and output disk. Due to this construction, in a toroidal CVT, a torque shift may also occur wherein the speed ratio varies due to fluctuations of input torque or looseness of component elements.

Due to this torque shift, hysteresis occurs in the relation between the input torque and gyration angle of the power rollers which corresponds to the CVT speed ratio. As a result, it may occur that the gyration angle of the power rollers fluctuates in a certain range centered on the GNP even if the step number of a step motor which varies the gyration angle of the power rollers is precisely set.

If a fluctuation of the speed ratio of the CVT occurs in the vicinity of the geared neutral point GNP, a shock may be produced due to the difference between the rotation speed of the CVT output shaft corresponding to the GNP and the real rotation speed of the CVT output shaft in the instant when the power recirculation clutch is engaged.

Further, if the CVT speed ratio varies in the reverse direction to the forward direction intended by the driver, a creep torque may act on the drive wheels in the reverse direction to the forward direction immediately after the power recirculation clutch is engaged, and the driver may therefore experience an uncomfortable feeling.

It is therefore an object of this invention to prevent a shock due to drift of CVT speed ratio in the vicinity of the GNP, and prevent the driver from experiencing an uncomfortable feeling, in an infinite speed ratio transmission.

In order to achieve the above object, this invention provides a speed change controller for an infinite speed ratio transmission for a vehicle. The infinite speed ratio transmission comprises an input shaft, a continuously variable transmission which transmits a rotation speed of the input shaft to a first output shaft at an arbitrary speed ratio, a fixed speed ratio transmission which transmits the rotation speed of the input shaft to a second output shaft at a fixed speed ratio, a planetary gear set comprising a first rotation element joined to the first output shaft, a second rotation element, and a third rotation element which varies a rotation direction and a rotation speed according to a difference of a rotation speed of the first rotation element and a rotation speed of the second rotation element, and a clutch joining the second output shaft and second rotation element.

The controller comprises a selector lever which selects one of a stationary range, forward motion range and reverse motion range, a sensor which detects a range selected by the selector lever, an actuator which varies the speed ratio of the continuously variable transmission according to an operating position, and a microprocessor programmed. The microprocessor is programmed to determine whether or not the range selected by the selector lever has changed from the stationary range to one of the forward motion range and the reverse motion range, change the operation position of the actuator to a predetermined position when the range selected by the selector lever has changed from the stationary range to one of the forward motion range and the reverse motion range, and change the operation position of the actuator from the predetermined position to the position corresponding to a geared neutral point which a rotation speed of the third rotation element becomes zero. The predetermined position is set so as to be different from the position corresponding to the geared neutral point.

The operating position of the actuator has a hysteresis region with respect to the speed ratio of the continuously variable transmission according to a transmission torque of the continuously variable transmission.

So the microprocessor may be programmed to disengage the clutch when the range selected by the selector lever is the stationary range, maintain the actuator at an operating position corresponding to a geared neutral point at which the rotation speed of the third rotation element is zero, when the range selected by the selector lever is the stationary range, determine whether or not the range selected by the selector lever has changed from the stationary range to one of the forward motion range and the reverse range, change the operation position of the actuator from the operating position corresponding to the geared neutral point to a first position when the range selected by the selector lever has changed from the stationary range to one of the forward motion range and reverse motion range, and change the operation position of the actuator from the first position to a second position. The second position corresponds to an operating position of the actuator which is displaced from the operating position corresponding to the geared neutral point in a direction represented by the range selected by the selector lever, and which realizes the geared neutral point when the clutch is engaged. The first position corresponds to an operating position of the actuator which is further displaced from the second position in the direction represented by the range selected by the selector lever.

The microprocessor may also be programed to disengage the clutch when the range selected by the selector lever is the stationary range, determine whether or not the range selected by the selector lever has changed from the stationary range to one of the forward motion range and reverse motion range, change the operation position of the actuator to a predetermined position when the range selected by the selector lever has changed from the stationary range to one of the forward motion range and reverse motion range, and engage the clutch after the operation position of the actuator has been changed to the predetermined position. The predetermined position corresponds to an operating position of the actuator which is displaced from the operating position corresponding to the geared neutral point in a direction represented by the range selected by the selector lever, and which corresponds to a boundary part of the hysteresis region.

The microprocessor may also be programed to determine whether or not the range selected by the selector lever has changed from the stationary range to one of the forward motion range and reverse motion range, and change the operation position of the actuator to a predetermined position when the range selected by the selector lever has changed from the stationary range to one of the forward motion range and reverse motion range. The predetermined position corresponds to an operating position of the actuator corresponding to the geared neutral point in a state where a torque transmitted by the continuously variable transmission is increased.

The details as well as other features and advantages of this invention are set forth in the remainder of the specification and are shown in the accompanying drawings.

BRIEF DESCRIPTION OF THE DRAWINGS

FIGS. 7A–7C are diagrams describing operation in a power recirculation mode of a planetary gear set adopted in the IVT.

FIGS. 15A–15D are timing charts describing the variation of a clutch pressure of the power recirculation clutch and step number STEP of the step motor when there is a change-over from the N/P range to the D range, under the control of the control unit.

FIGS. 16A–16D are timing charts describing the variation of the clutch pressure of the power recirculation clutch and step number STEP of the step motor when there is a change-over from the N/P range to the R range, under the control of the control unit.

DESCRIPTION OF THE PREFERRED EMBODIMENTS

Figure 1:
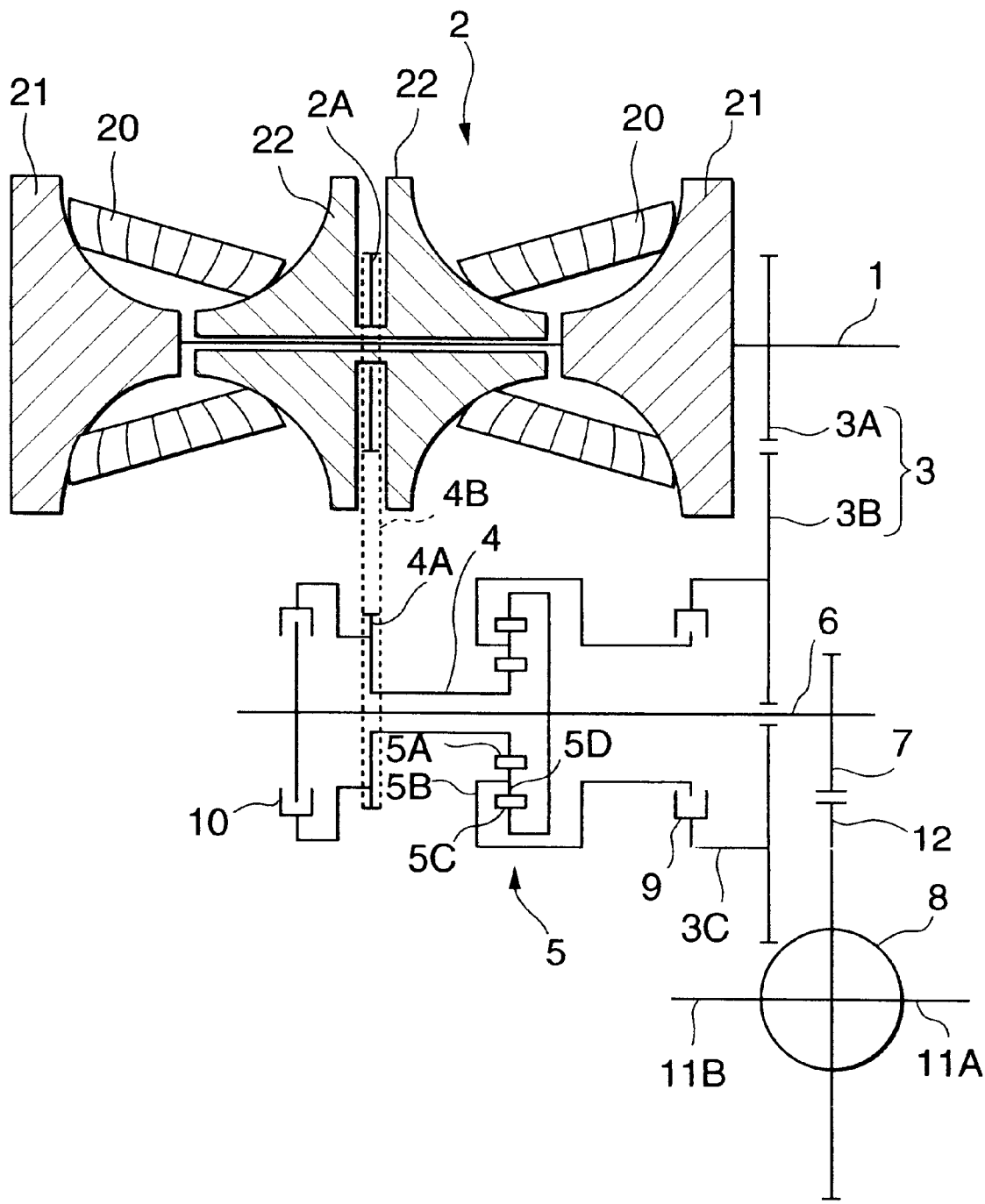
FIG. 1 is a schematic diagram of an IVT to which this invention is applied.
Figure 2:
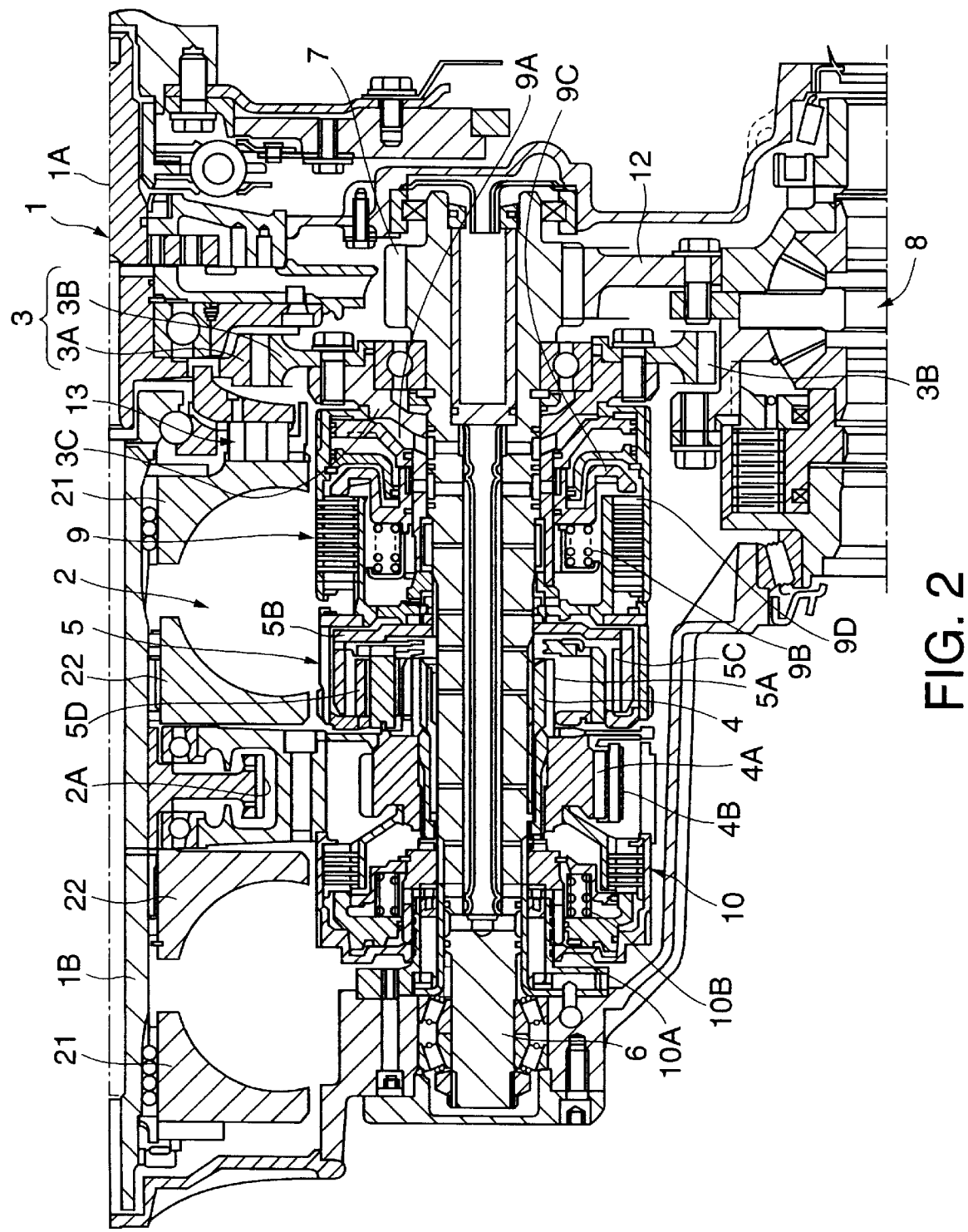
FIG. 2 is a vertical cross-sectional view of the IVT.

Referring to FIGS. 1 and 2, an infinite speed ratio transmission for vehicles (referred to hereafter as IVT) to which this invention is applied, comprises an input shaft 1 which rotates together with a crank shaft of an engine, a continuously variable transmission (referred to hereafter as CVT )

2, a reduction gear unit 3, a planetary gear set 5, a power recirculation clutch 9, a direct clutch 10, and a final output shaft 6.

The CVT 2 comprises a so-called half-toroidal and double-cavity type continuously variable transmission. The input shaft 1 comprises a shaft 1A joined to the engine crank shaft, not shown, and a shaft 1B which rotates together with the shaft 1A via a loading cam 13.

Figure 4:
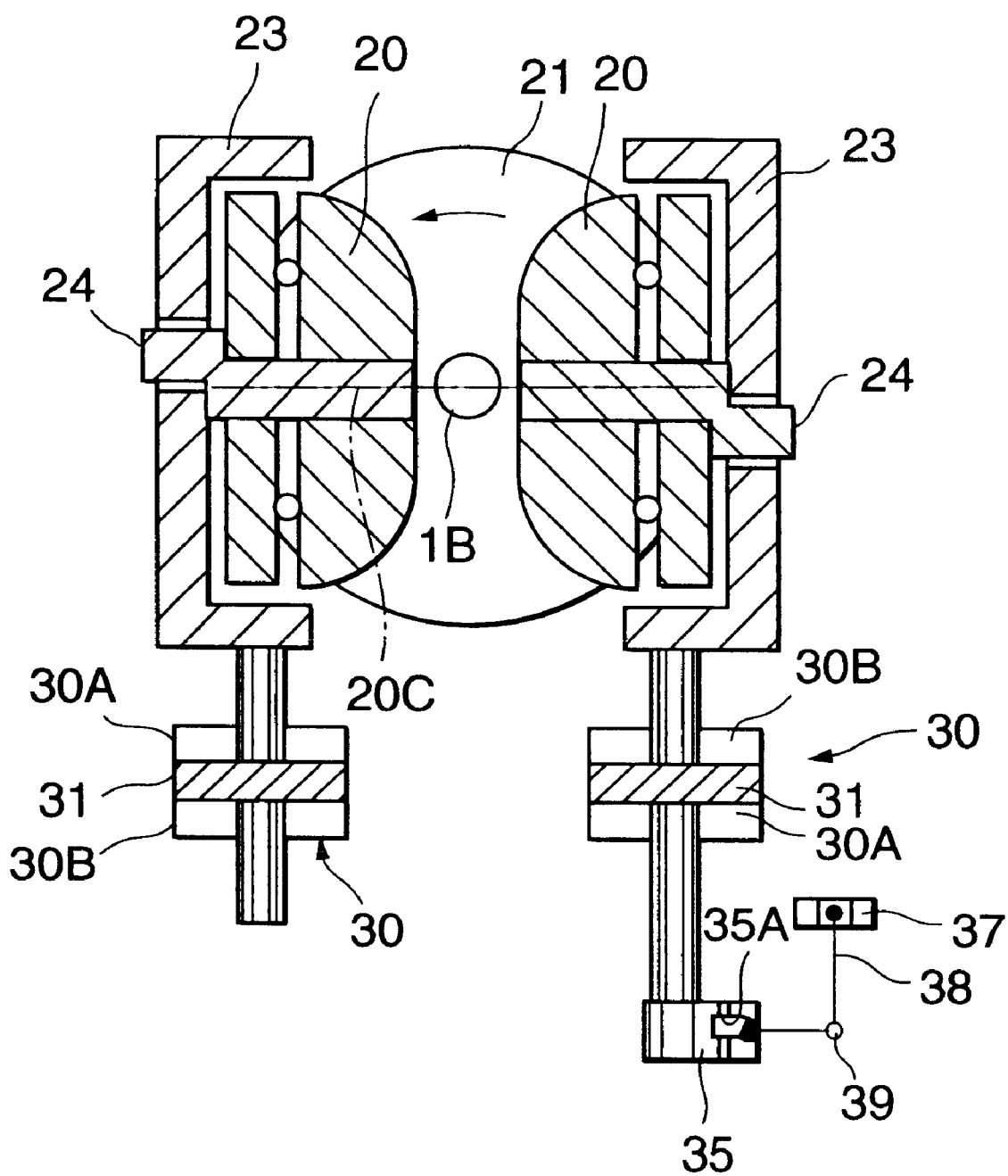
FIG. 4 is a cross-sectional view of essential parts of a toroidal CVT adopted in the IVT.

The CVT 2 comprises two sets of input disks 21 and output disks 22 disposed facing each other on the shaft 1B. A pair of power rollers 20 as shown in FIG. 4 are gripped between each set of the input disks 21 and output disks 22. The input disks 21 are joined to the shaft 1B. The loading cam 13 generates a thrust force according to the rotation of the shaft 1A, and presses each of the input disks 21 against the corresponding output disk 22. Due to this pressing force, the power rollers 20 are always kept in contact with the input disks 21 and output disks 22, and transmit a torque between these disks.

The rotation of the output disks 22 is transmitted to a CVT output shaft 4 via a sprocket 2A, chain 4B and sprocket 4A.

Referring to FIG. 4, the power rollers 20 are supported by trunnions 23 via a pivot shaft 24. The trunnions 23 are driven in the vertical direction of FIG. 4 by an oil pressure cylinder 30. The oil pressure cylinder 30 comprises a piston 31 fixed to the trunnion 23 and oil chambers 30A, 30B facing the piston 31. When the trunnions 23 displace in an axial direction according to the pressure difference of the oil chambers 30A, 30B, the contact point between the power rollers 20, input disks 21 and output disks 22 changes. As a result, the balance of forces around the axis of the trunnions 23 exerted by the disks 21, 22 on the power rollers 20, changes, and the gyration angle of the power rollers 20 changes. The trunnions 23 also undergo a rotational displacement together with the displacement of the power rollers 20 in the gyration direction. Due to the variation in the gyration angle of the power rollers 20, the ratio of the rotation transmitted from the input disks 21 to the output disks 22, i.e., the CVT speed ratio lc, varies continuously.

Insofar as concerns the trunnions 23 facing each other, the oil chamber 30A of one of the trunnions 23 is disposed above the piston 31, and the oil chamber 30A of the other trunnion 23 is disposed below the piston 31. Likewise, the oil chamber 30B of one of the trunnions 23 is disposed above the piston 31, and the oil chamber 30B of the other trunnion 23 is disposed below the piston 31. An identical oil pressure is supplied to the two oil chambers 30A, and similarly, an identical oil pressure is supplied to the two oil chambers 30B. Due to the arrangement of these oil chambers 30A, 30B, the two trunnions 23 are driven in mutually opposite directions. Specifically, when the oil pressure of the oil chamber 30A increases relative to that of the oil chamber 30B, the trunnion 23 on the right of FIG. 4 moves up, the trunnion 23 on the left moves down, and the gyration angle of the power rollers 20 varies in a direction which increases the CVT speed ratio lc. when the oil pressure of the oil chamber 30B increases relative to that of the oil chamber 30A, the trunnion 23 on the right of FIG. 4 moves down, the trunnion 23 on the left moves up, and the gyration angle of the power rollers 20 varies in a direction which decreases the CVT speed ratio lc.

The CVT 2 comprises a total of four of the trunnions 23, and a precess cam 35 is attached to one of them. Oil pressure is selectively supplied from a shift control valve 46 shown in FIG. 5 to the oil chambers 30A, 30B. The precess cam 35 feeds back the rotation angle of the trunnions 23, i.e., a gyration angle φ of the power rollers 20 and the axial displacement of the trunnions 23, to the shift control valve 46. A cam groove 35A which slants in a circumferential direction as shown in FIG. 4 is formed in the precess cam 35, one end of an L-shaped feedback link 38 engaging with this cam groove 35A.

The feedback link 38 is supported free to pivot around a pivot shaft 39, one end engaging with the cam groove 35A and the other end being connected to one end of a speed change link 37.

Figure 5:
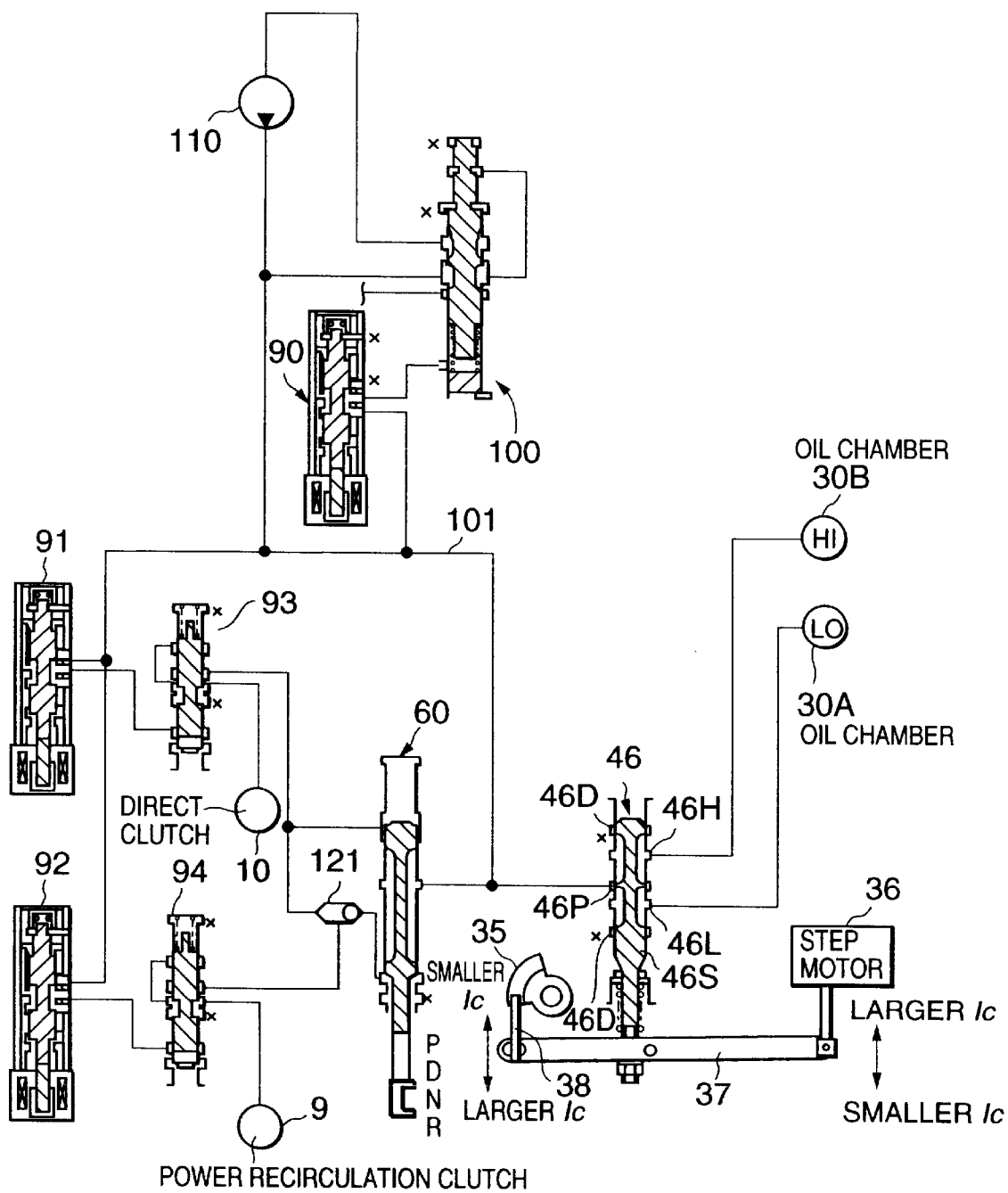
FIG. 5 is a circuit diagram of an oil pressure circuit of the IVT.

Referring to FIG. 5, the speed change link 37 is connected in its middle part to one end of a spool 46S of the shift control valve 46, and its ends on the opposite side to the connection with the feedback link 38 are connected to a step motor 36. Due to this arrangement, the speed change link 37 displaces the spool 46S in an axial direction according to the drive of the step motor 36, and displaces the spool 46S in an axial direction according to the rotational displacement and axial displacement of the precess cam 35. As a result, the spool 46S is maintained at a position in which the step motor 36 and the displacement of the precess cam 35 are balanced.

Referring again to FIG. 1, the CVT output shaft 4 is joined to a sun gear 5A of the planetary gear set 5. It is also joined to the final output shaft 6 via the direct clutch 10.

The reduction gear unit 3 comprises a gear 3A which rotates together with the shaft 1B, a gear 3B and a reduction gear output shaft 3C. The gear 3A is meshed with the gear 3B, and the gear 3B is joined to the reduction gear output shaft 3C. The reduction gear unit 3 always transmits rotation under a fixed speed ratio. The reduction gear output shaft 3C is joined via the power recirculation clutch 9 to a planet carrier 5B which holds planet gears 5D of the planetary gear set 5. A ring gear 5C of the planetary gear set 5 is joined to the final output shaft 6.

The rotation of the final output shaft 6 is transmitted to vehicle drive wheels 11A, 11B via a transmission output gear 7, final gear 12 and differential gear 8.

Figure 24:
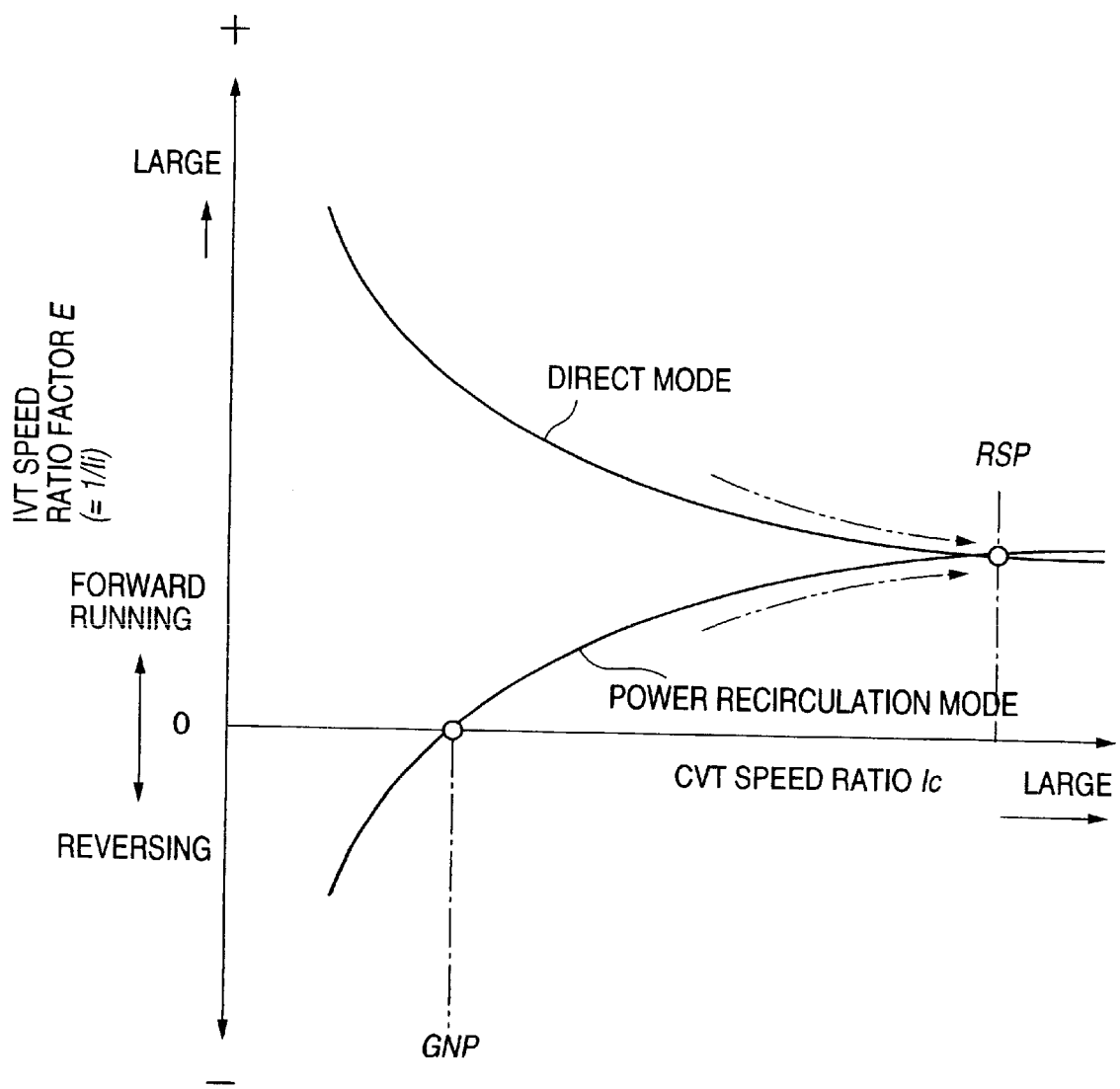
FIG. 24 is a diagram describing a relation between the CVT speed ratio lc and IVT speed ratio factor E.

In this IVT, the relation between the speed ratio lc of the CVT 2 and the speed ratio factor E of the IVT is shown by the diagram of FIG. 24. Herein, the speed ratio factor E of the IVT is the inverse of the IVT speed ratio li, i.e., the inverse of the ratio of the rotation speeds of the input shaft 1 and final output shaft 6.

As shown by the diagram of FIG. 24, the IVT speed ratio factor E varies according to the speed ratio lc of the CVT 2. In the power recirculation mode wherein the power recirculation clutch 9 is engaged and the direct clutch 10 is disengaged, the IVT speed ratio factor E is 0 at the geared neutral point GNP. In other words, the IVT speed ratio li increases as the geared neutral point GNP is approached for both forward and reverse motion of the vehicle, and is infinitely large at the GNP.

On the other hand, in the direct mode wherein the power recirculation clutch 9 is disengaged and the direct clutch 10 is engaged, the IVT speed ratio factor E increases with decrease of the speed ratio lc of the CVT 2.

Next, referring to FIG. 2, the power recirculation clutch 9 is engaged due to a clutch pressure Pprc supplied to the oil chamber 9A exerting an engaging force on a disk 9D via a pressing member 9C against a return spring 9B. The direct clutch 10 is engaged by a clutch pressure Pdc supplied to an oil chamber 10A against a return spring 10A.

Figure 3:
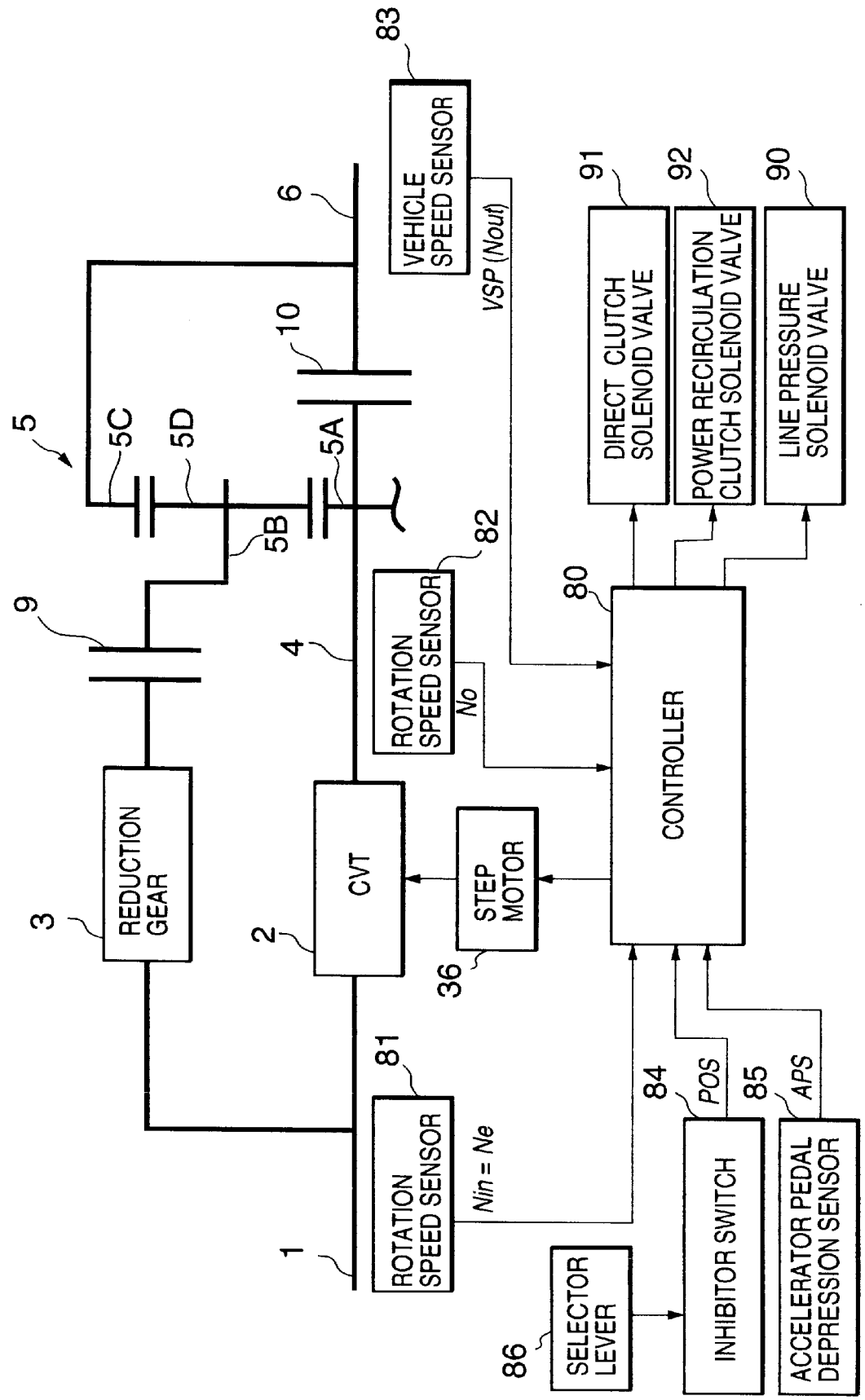
FIG. 3 is a schematic diagram of a speed change controller according to this invention.

The operation of the power recirculation clutch 9 and direct clutch 10 is performed by a signal output from a control unit 80 shown in FIG. 3.

For this purpose, a shift position signal POS is input from an inhibitor switch 84 which detects a selection range of a selector lever 86 with which the vehicle is provided.

When the selection range of the selector lever 86 is the N range (neutral range) or P range (parking range), the power recirculation clutch 9 and direct clutch 10 are both disengaged. The N range and P range are generically named as a stationary range.

When the selection range of the selection lever 86 is the D range (drive range), one of the clutches is engaged and the other clutch is released depending on the running mode. In the R range (reverse range), the power recirculation clutch 9 is engaged and the direct clutch 10 is disengaged. The operation of the power recirculation clutch 9 is performed by a signal output to a solenoid valve 91. Also, the operation of the direct clutch 10 is performed by a signal output to a solenoid valve 92. In both cases, the engaging pressure supplied to the clutch is larger the larger the duty ratio of the output signal.

The inhibitor switch 84 identifies only the above four ranges. When there are forward travel ranges other than the D range, these ranges are also identified as the D range. The D range and the other forward travel ranges are generically named as a forward motion range.

When the vehicle is starting, as shown in FIG. 24, the control unit 80 causes the IVT to start speed change from the geared neutral point GNP of the power recirculation mode.

The speed change control of the IVT is also performed by the control unit 80. For this purpose, signals are input to the control unit 80 respectively from a first rotation speed sensor 81 which detects a rotation speed Ni of the input shaft 1, a second rotation speed sensor 82 which detects a rotation speed No of the CVT output shaft 4, a vehicle speed sensor 83 which detects a vehicle speed VSP from the rotation speed of the final output shaft 6, and an accelerator pedal depression sensor 85 which detects a depression amount APS of an accelerator pedal with which the vehicle is provided. As the input shaft 1 is joined to the engine, the rotation speed Ni of the input shaft 1 is equal to the engine rotation speed Ne.

Based on the vehicle running conditions represented by these input signals, the control unit 80 calculates a target speed ratio of the IVT, calculates a target CVT speed ratio Tlc, and outputs a corresponding step number signal to the step motor 36.

This control of the IVT by the control unit 80 is performed via an oil pressure circuit shown in FIG. 5.

In this oil pressure circuit, an oil pressure supplied from an oil pressure pump 110 is adjusted to a predetermined line pressure PL by a pressure regulator 100 controlled by a signal pressure from the line pressure solenoid valve 90, and supplied to a line pressure circuit 101.

The shift control valve 46 which controls the supply direction and flowrate of oil to the oil chambers 30A, 30B of the oil pressure cylinders 30, is connected to the line pressure circuit 101. The shift control valve 46 supplies the line pressure PL to the oil chambers 30A or 30B according to the displacement of the spool 46S, and releases the other chambers to a drain.

For this purpose, the shift control valve 46 is provided with a supply port 46P connected to the line pressure circuit 101, an output port 46L connected to the oil chamber 30A, an output port 46H connected to the oil chamber 30B, and two drain ports 46D, facing the spool 46S.

When the target CVT speed ratio Tic is increasing, the control unit 80 decreases the step number STEP output to the step motor 36. As a result, the right-hand end of the speed change link 37 shown in FIG. 5 displaces upwards, and the spool 46S also displaces to the upper part of the figure. Due to this displacement, the line pressure PL acts on the oil chambers 30A from the supply port 46P, and the oil chambers 30B are released to the drain via the upper drain port 46D. As a result, oil is supplied to the oil chambers 30A at a flowrate depending on the pressure difference produced between the oil chambers 30A and 30B, the trunnion 23 on the right of FIG. 4 moves upwards, and the trunnion 23 on the left of FIG. 4 moves downwards.

Due to the upward motion of the trunnion 23 on the right of FIG. 4, the power roller 20 undergoes a rotational displacement in an anticlockwise direction viewed from the upper part of the figure and the CVT speed ratio lc increases. When the trunnion 23 moves upwards, the rotational displacement of the power roller 20 causes the feedback link 38 to displace in the clockwise direction of the figure via the precess cam 35. This displacement causes the spool 46S to move downwards in FIG. 5 via the speed change link 37. As a result, the spool 46S which was moving upwards gradually returns to a neutral position, and the CVT speed ratio lc is controlled to the target CVT speed ratio Tlc.

On the other hand, when the target CVT speed ratio Tlc is decreasing, the control unit 80 increases the step number STEP output to the step motor 36. As a result, the right-hand end of the speed change link 37 shown in FIG. 5 moves downwards, and the spool 46S also displaces downwards in the figure. Due to this displacement, the line pressure PL acts on the oil chambers 30B from the supply port 46P, and the oil chambers 30A are released to the drain via the upper drain port 46D. As a result, oil is supplied to the oil chambers 30B at a flowrate depending on the pressure difference produced between the oil chambers 30A and 30B, the trunnion 23 on the right of FIG. 4 moves downwards, and the trunnion 23 on the left of FIG. 4 moves upwards, and the CVT speed ratio lc decreases.

Due to the descent of the trunnion 23 on the right-hand side of FIG. 4, the power roller 20 undergoes a rotational displacement in the clockwise direction viewed from the upper part of the figure, and decrease the CVT speed ratio lc. The descent of the trunnion 23 and the displacement of the power roller 20 cause the feedback link 38 to undergo a displacement in the anticlockwise direction via the precess cam 35. This displacement causes the spool 46S to displace upward in FIG. 5 via the speed change link 37. As a result, the spool 46S which was displacing downwards now gradually returns to the neutral position, and the CVT speed ratio lc is controlled to the target CVT speed ratio Tlc.

Figure 17:
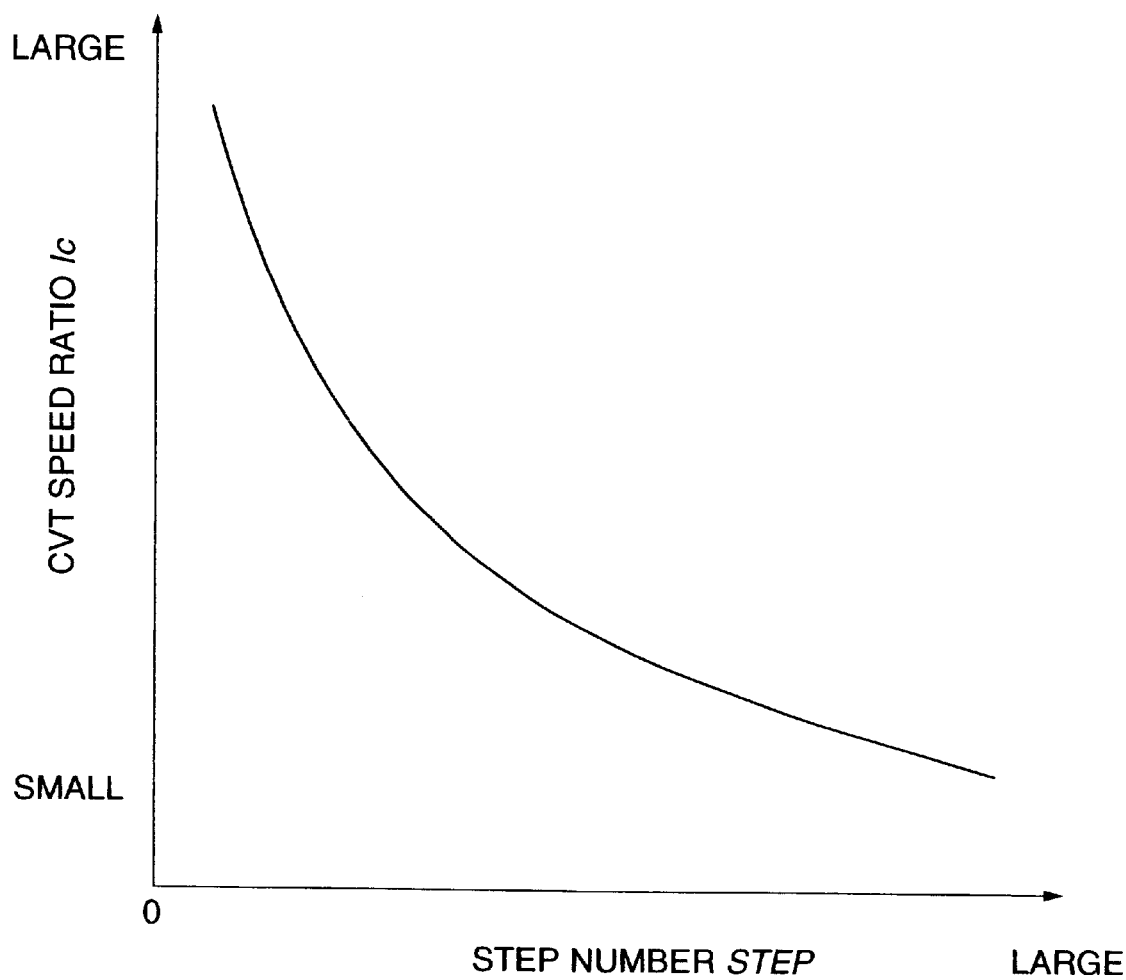
FIG. 17 is a map specifying a relation between the step number STEP of the step motor and a target CVT speed ratio Tlc stored by the control unit.

To perform the aforesaid control of the step motor 36, a map shown in FIG. 17 specifying a relation between the target CVT speed ratio Tlc and the step number STEP of the step motor 36 is prestored in the control unit 80, and the control unit 80 determines the step number STEP output to the step motor 36 by looking up this map based on the target CVT speed ratio Tlc.

The solenoid valve 92 which controls the power recirculation clutch 9 and the solenoid valve 91 which controls the direct clutch 10 are connected to the line pressure circuit 101. The solenoid valve 91, 92 are respectively controlled by duty signals output by the control unit 80.

Supply of engaging pressure to the power recirculation clutch 9 is performed by a control valve 94 in response to a signal pressure of the solenoid valve 92. Supply of engaging pressure to the direct clutch 10 is performed by a control valve 93 in response to a signal pressure of the solenoid valve 91.

When the signal pressure of the solenoid valve 92 is low, the control valve 94 disengages the engaging pressure of the power recirculation clutch 9 to the drain, and when the signal pressure rises, the pressure supplied via a shuttle valve 121 is adjusted according to the signal pressure, and is supplied to the power recirculation clutch 9. When the signal pressure of the solenoid valve 91 is low, the control valve 93 releases the engaging pressure of the direct clutch 10 to the drain, and when the signal pressure rises, the pressure supplied from a manual valve 60 is adjusted according to the signal pressure, and is supplied to the direct clutch 10.

The shuttle valve 121 is connected to the manual valve 60. The manual valve 60 operates in conjunction with the selector lever 86 shown in FIG. 3. In the D range or R range, the manual valve 60 supplies the line pressure PL of the line pressure circuit 101 to the control valve 94 via the shuttle valve 121, and in the D range only, it supplies the line pressure PL of the line pressure circuit 101 to the control valve 93.

Therefore, in the D range, when the signal pressure of the solenoid valve 91 rises, engaging force is supplied to the direct clutch 10, and when the signal pressure of the solenoid valve 90 rises, engaging force is supplied to the power recirculation clutch 9. On the other hand, in the R range, engaging pressure is not supplied to the direct clutch 10 regardless of the signal pressure of the solenoid valve 91, and when the signal pressure the solenoid valve 92 rises, engaging force is supplied to the power recirculation clutch 9.

The control unit 80 controls the engaging force of the power recirculation clutch 9 and direct clutch 10 via a duty ratio of an output signal to the solenoid valves 91, 92.

When the vehicle is at rest and the selector lever 86 has selected the N range or P range (referred to hereafter as N/P range), the power recirculation clutch 9 is disengaged and the drive wheels 11A, 11B are disconnected from the engine. The CVT speed ratio lc is also controlled to the geared neutral point GNP. However when the vehicle is at rest and the selector lever 86 has selected the D range, the power recirculation clutch remains engaged.

When the vehicle starts, the control unit 80 gradually engages the power recirculation clutch 9 by energizing the solenoid valve 92 based on a selection range POS detected by the inhibitor switch 84, a real CVT speed ratio Rlc calculated from the output signals of the first rotation speed sensor 81 and second rotation speed sensor 82, and the engine rotation speed Ne. A step number STEP is also output to the step motor 36 so that the IVT speed ratio Tlc becomes a target value depending on the running state.

Next, the torque transmission direction in the CVT 2 will be described.

In the direct mode, the input torque from the engine is transmitted to the output disk 22 from the input disk 21.

In the power recirculation mode, there is a change-over between forward motion and reverse motion at the geared neutral point GNP, so the input torque to the CVT 2 also varies accordingly.

Assuming the torque transmission direction from the input disk 21 to the output disk 22 as the positive direction, when the vehicle is moving forward, torque is transmitted from the output disk 22 to the input disk 21, i.e. in the negative direction.

Figure 6:
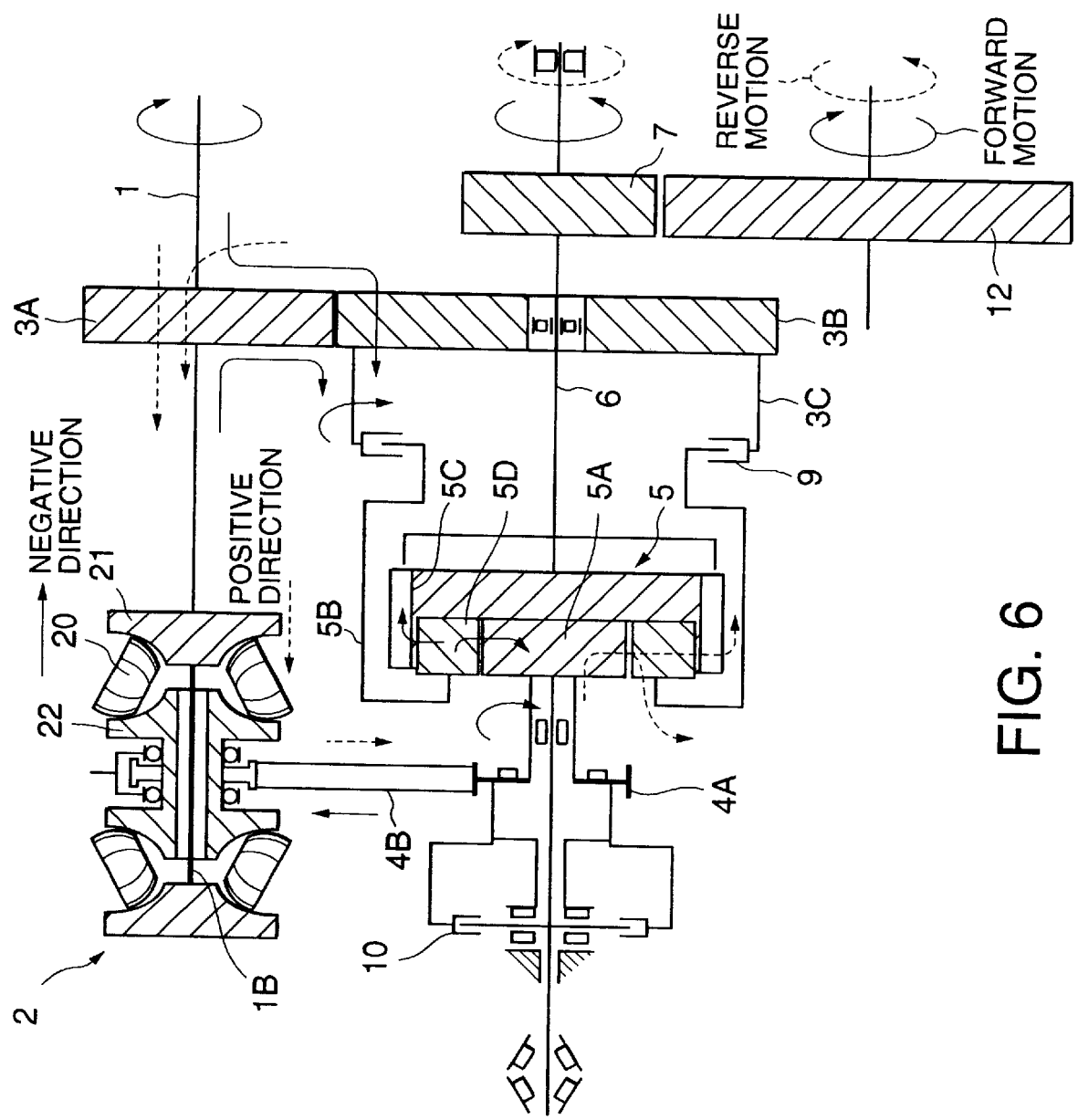
FIG. 6 is a diagram describing torque transmission in the IVT.

Referring to FIG. 6, in the power recirculation mode when the power recirculation clutch 9 is engaged and the direct clutch 10 is disengaged, the rotation direction of the ring gear 5C changes depending on the difference between the output rotation speeds of the CVT 2 and reduction gear unit 3, i.e., the difference between the rotation speed of the sun gear 5A and rotation speed of the planet carrier 5B.

The rotation directions of the sun gear 5A, planet carrier 5B and ring gear 5C in various running states are shown in FIGS. 7A–7C, looking at the planetary gear set 5 from the right of FIG. 6. The solid arrows in the figure show the speed and direction of component elements, and the broken arrows show the torque transmission direction.

Referring to FIG. 7A, when the rotation speed of the planet carrier 5B, which in this case is the speed of the planet gears 5D rotating around the sun gear 5A, is greater than the rotation speed of the sun gear 5A, or in other words, when the CVT speed ratio is greater than the geared neutral point GNP shown in FIG. 24, the planet gears 5D rotate in the anticlockwise direction of the figure. The ring gear 5C therefore also rotates anticlockwise in the figure, and the vehicle moves forward.

In this case, the rotation torque of the reduction gear output shaft 3C is transmitted to the planet carrier 5B, and this torque rotates the planet gears 5D anticlockwise around the sun gear 5A, as shown in FIG. 7A.

Since the planet gears 5D are meshed with both the sun gear 5A and ring gear 5C, the rotation torque is transmitted from the planet gears 5D to the ring gear 5C and sun gear 5A as shown by the broken arrow in the figure. The rotation torque transmitted to the sun gear 5A is input to the output disk 22 via a chain 4B from the CVT output shaft 4A joined to the sun gear 5A as shown by the solid arrow in FIG. 6, and torque transmission takes place from the output disk 22 to the input disk 21, i.e., a negative torque transmission occurs. The torque transmitted from the output disk 22 to the input disk 21 is recirculated to the reduction gear unit 3 via the input shaft 1.

Next, referring to FIG. 7B, when the rotation speed of the sun gear 5A is larger than the rotation speed of the planet carrier 5B, i.e., when the CVT speed ratio of the CVT 2 is smaller than the geared neutral point GNP shown in FIG. 24, the planet gears 5D rotate clockwise in the figure. As a result, the ring gear 5C also rotates clockwise in the figure, and the vehicle is made to reverse.

In this case, the rotation torque of the sun gear 5A which rotates due to the output of the CVT 2, is transmitted to the planet carrier 5B and ring gear 5C. In the CVT 2, torque is transmitted from the input disk 21 to the output disk 22, i.e., torque transmission occurs in a positive direction, as shown by the broken arrow in FIG. 6. The torque transmitted from the sun gear 5A to the planet carrier 5B is recirculated to the input disk 21 via the reduction gear unit 3 and input shaft 1.

Next, referring to FIG. 7C, when the ratio of the rotation speed of the sun gear 5A and rotation speed of the planet carrier 5B reaches a value corresponding to the gear ratio of the sun gear 5A and ring gear 5C, the rotation of the planet carrier 5B in the anticlockwise direction of the figure and the rotation of the planet gears 5D in the clockwise direction of the figure are balanced, so the ring gear 5C stops. In this case, the rotation torque input from the engine to the input shaft 1 simply rotates the CVT 2 and reduction gear unit 3 without resistance, and torque is not transmitted to the ring gear 5C. Therefore, although the CVT 2 continues rotating, the vehicle is in the stationary state. The input shaft 1 rotates, but the final output shaft 6 does not rotate, so in this case the IVT speed ratio li is infinite.

The running pattern of the IVT in the power recirculation mode is as described above, however the IVT has the following problem inherent in this running pattern.

In a toroidal CVT 2, the speed ratio fluctuates when the transmitted torque fluctuates, i.e., a phenomenon known as torque shift occurs. This refers to a variation of the gyration angle of the power rollers 20 accompanying a variation of transmitted torque although the step number STEP of the step motor 36 is fixed, due to factors such as for example variation of deformation amount of component elements of the CVT 2. This torque shift may be due to the following three factors.

First, in FIG. 4, when the output torque of the engine acts on the input disk 21, the power rollers 20 displace in the direction of action of the torque shown by the arrow in the figure, and rotation axes 20C of the power rollers 20 are offset relative to the shaft 1B. This offset drives the trunnion 23 on the right hand side of the figure upwards, and drives the trunnion 23 of the left-hand side of the figure downwards.

As a result, the precess cam 35 provided to the trunnion 23 on the right-hand side of the figure displaces in the same direction as when the CVT speed ratio increases, and the spool 46S of the shift control valve 46 shown in FIG. 5 displaces downwards.

When the upward force exerted by the input disk 21 on the trunnions 23, and the differential pressure in the oil pressure cylinders 30 due to the downward displacement of the spool 46S, are in equilibrium, the offset of the rotation axes 20C of the power rollers 20 from the shaft 1B is eliminated, and the CVT speed ratio stabilizes.

When the above offset occurs due to fluctuation of the input torque, the pivot shaft 24 bends in the vertical direction of FIG. 4. The bending deformation of this pivot shaft 24 reduces the axial displacement of the trunnion 23. As a result, the displacement amount of the trunnion 23 fed back by the precess cam 35 to the shift control valve 46, decreases, and the differential pressure in the oil pressure cylinder 30 relative to the actual offset amount of the power rollers 20 decreases. Consequently, in order to make the upward force acting on the trunnions 23 balance the differential pressure in the oil pressure cylinders 30, a larger feedback amount is necessary. To supply this required feedback amount, the trunnion 23 on the right hand side of FIG. 4 must be moved further upwards, and the gyration angle of the power roller 20 must be varied more. This is the first factor causing a torque shift.

Next, in order that the input disk 21 and output disk 22 transmit torque via the power rollers 20, the loading cam 13 shown in FIG. 2 must generate a thrust force corresponding to the rotation torque of the shaft 1A. and the input disk 21 and output disk 22 must grip the power rollers 20 under this thrust force. As a result, a force acts on the power rollers 20 to move them in a direction away from the shaft 1B, i.e., in a direction tending to push it from the input disk 21 and the output disk 22 towards the outside.

The upper end and lower end of the trunnions 23 are connected by links. Therefore, the trunnions which support the power rollers 20 deform in such a way that they bulge toward the right and left of FIG. 4. Due to this deformation, the feedback amount of the precess cam 35 changes. This is the second factor causing a torque shift.

Next, the input disk 21 and output disk 22 which gripped the power rollers 20 under the thrust force of the loading cam 13, deform due to this thrust force.

Due to this deformation, the contact points between the power rollers 20 and input disk 21, and the contact points between the power rollers 20 and output disk 22, change. The change of these contact points causes the trunnions 23 to displace in an axial direction via the pivot shaft 24. This is the third factor causing a torque shift.

Next, the hysteresis in the torque shift will be described.

The case will be considered where the CVT speed ratio is maintained in the vicinity of the geared neutral point GNP, and the transmission torque of the CVT 2 fluctuates beyond 0.

As the trunnion 23 supports the power roller 20 via the pivot shaft 24, a clearance exists in the bearings between the pivot shaft 24 and trunnion 23. When the load acting on the trunnions 23 reverses direction due to a reverse of torque transmission direction, an amount of hysteresis is produced corresponding to this clearance. Further, the friction produced in these bearings delays the displacement of the trunnions 23 which makes the hysteresis prominent.

Figure 23:
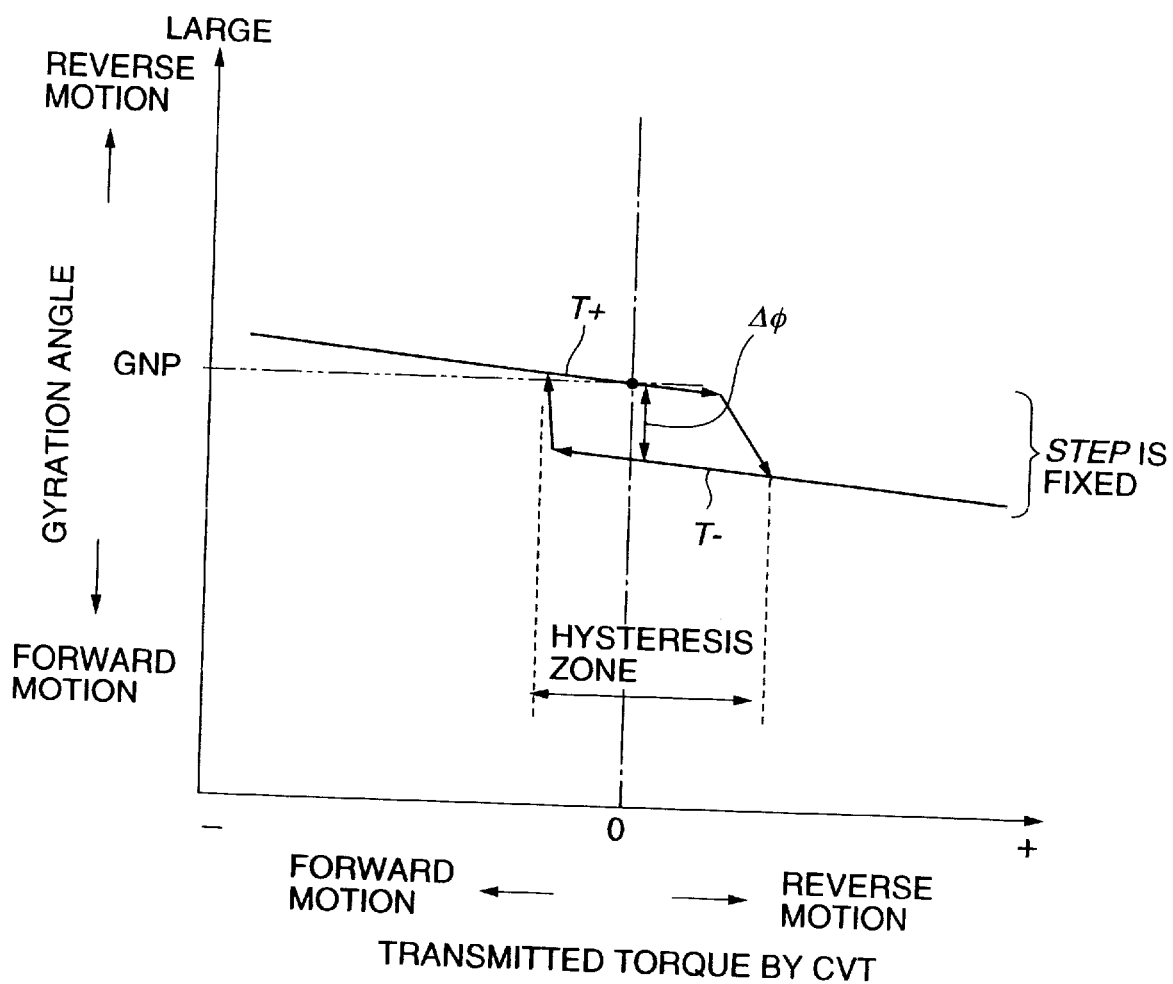
FIG. 23 is a diagram describing hysteresis produced in the relation between a torque shift and the gyration angle of power rollers in the vicinity of the geared neutral point GNP, when a toroidal CVT is adopted in the IVT.

As a result, as shown in FIG. 23, when the step number STEP is fixed, and the torque transmitted by the CVT 2 changes from positive to negative, the gyration angle of the power roller 20 varies along a line T−, and when the torque transmitted by the CVT 2 changes from negative to positive, the gyration angle of the power roller 20 varies along a line T+. In a gyration angle region $\Delta\phi$ of the power roller enclosed by these lines T+, T−, the interrelationship between the gyration angle of the power roller 20 and the transmission torque of the CVT 2 is unstable. Consequently, the initial torque which acts on the drive wheels when the vehicle starts is unstable, a shock may be produced due to the sudden application of a torque, and creep torque may also act in an unintended direction.

In other words, in a region where the transmission torque of the CVT 2 is close to 0, the step number STEP of the step motor 36 when the real gyration angle of the power roller 20 coincides with the geared neutral point GNP, lies between predetermined values STEP1, STEP2, but the precise value of STEP can not be determined in this hysteresis region.

In this hysteresis region, to prevent a torque unintended by the driver from acting on the drive wheels and to prevent a torque shock from occurring when the power recirculation clutch 9 is engaged, this controller performs the following control of the step motor 36.

Figure 8:
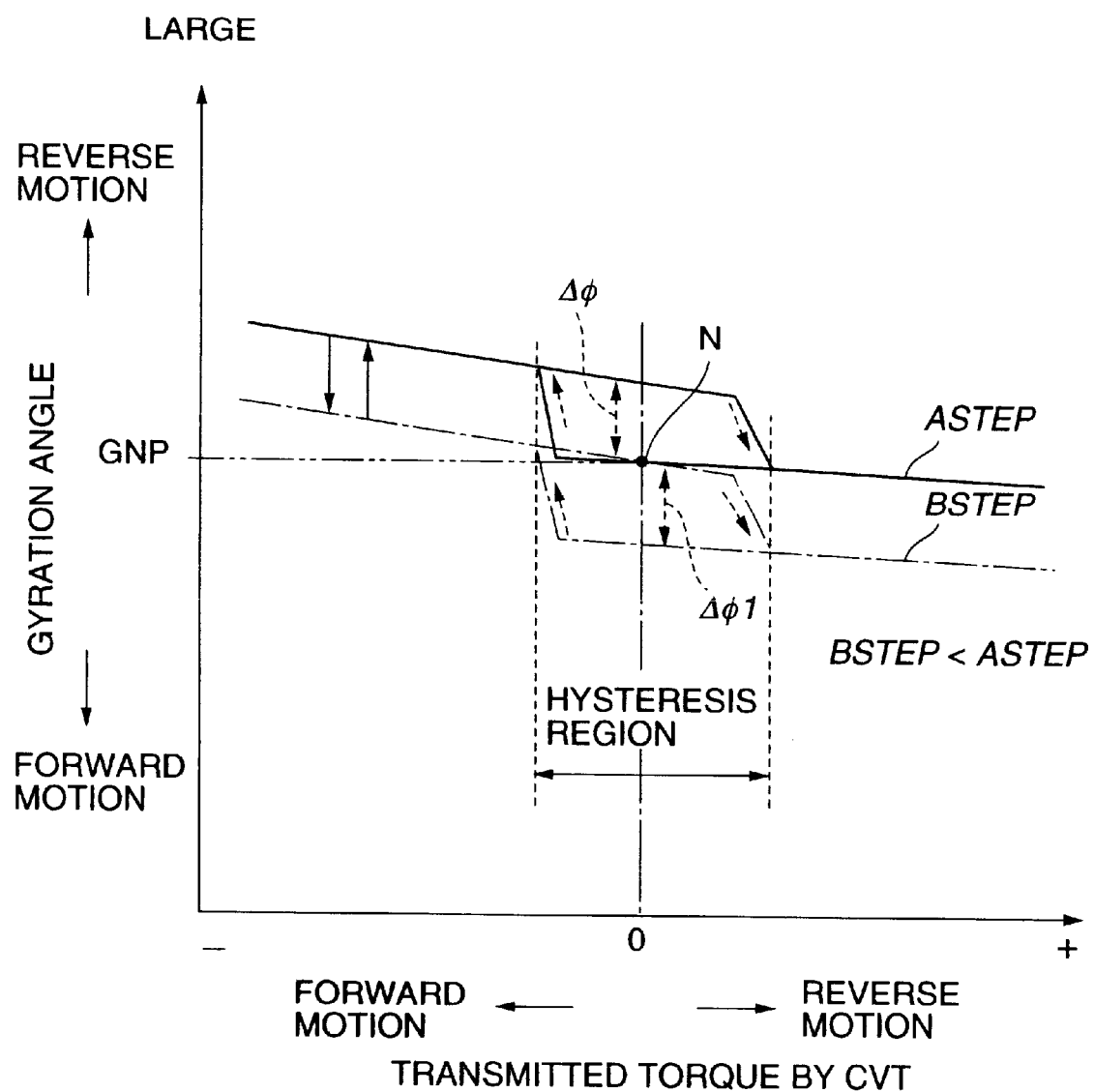
FIG. 8 is a diagram describing a relation of a transmission torque and gyration angle of power rollers when there is a change-over from a N/P range to a D range.
Figure 9:
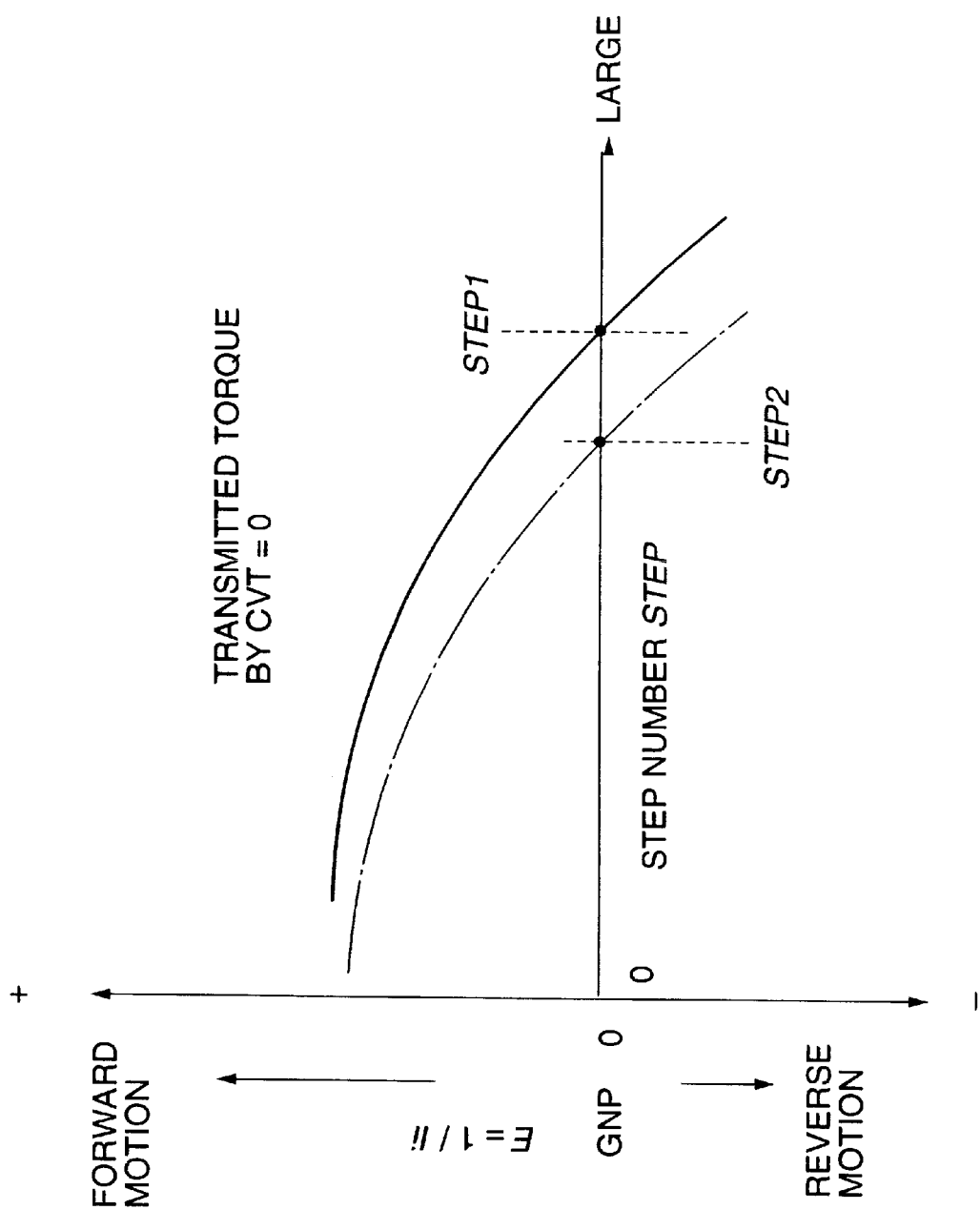
FIG. 9 is a diagram describing a relation between an IVT speed ratio factor E and a step number STEP of a step motor in the vicinity of a geared neutral point GNP in the power recirculation mode.
Figure 10:
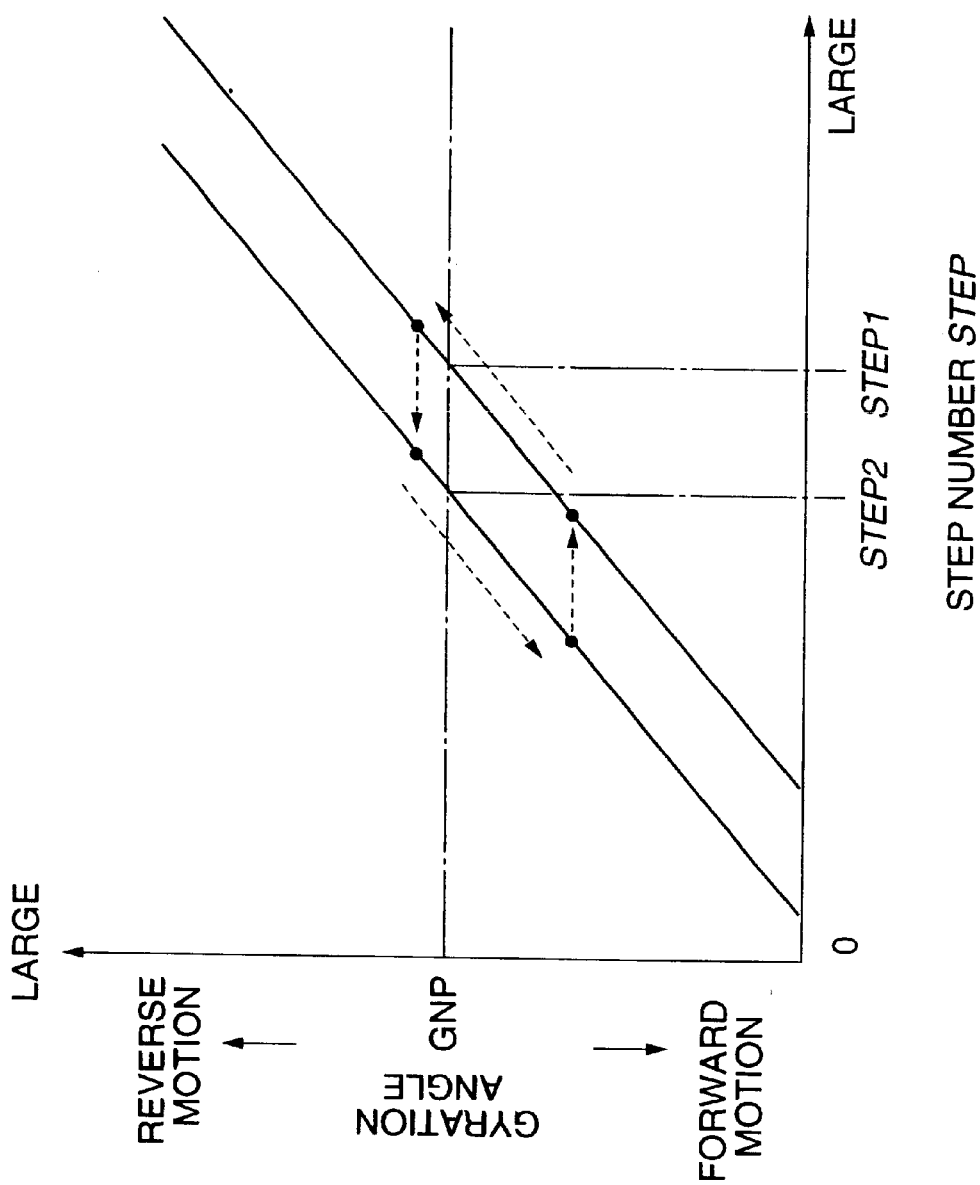
FIG. 10 is a diagram describing a relation between the step number STEP of the step motor and gyration angle of the power rollers in the vicinity of the geared neutral point GNP in the power recirculation mode.

First, a step number at which the transmission torque on the line T− is 0, is taken as a first value ASTEP. In other words, the minimum value of the gyration angle region $\Delta\phi$ at which the transmission torque of the CVT 2 is 0, is taken as the first value ASTEP as shown in FIG. 8. When the vehicle is in the stationary state in the N/P range, the control unit 80 disengages the power recirculation clutch 9 after fixing the step number of the step motor 36 at this first value ASTEP. The real gyration angle exists somewhere in the hysteresis region $\Delta\phi$ of the figure when the step number is fixed at the first step value ASTEP.

In this state, when a change-over of the selector lever 86 to the D range is detected, the control unit 80 varies the step number STEP of the step motor 36 by a predetermined number in the forward motion direction of the vehicle. When a change-over of the selector lever 86 to the R range is detected, the step number of the step motor 36 is varied by a predetermined number in the reverse motion direction of the vehicle.

The case will be described where the power recirculation clutch 9 is disengaged and a change-over from the N/P range to the D range is detected. The control unit 80 temporarily decreases the step number STEP output to the step motor 36 from the first value ASTEP to a second value BSTEP shown by the dotted line in FIG. 8. Due to this operation, the CVT speed ratio temporarily increases. The control unit 80 then returns the step number STEP to the first value ASTEP before the power recirculation clutch 9 is engaged.

The second value BSTEP is set so that the maximum value of the fluctuation region $\Delta\phi 1$ of the real gyration angle when the step number STEP is set to the second value BSTEP, is equal to the minimum value of the hysteresis region $\Delta\phi$ when the step number STEP is set to the first value ASTEP.

When the step number STEP output by the control unit 80 to the step motor 36 has a small value, it causes a large CVT speed ratio, and when it has a large value, it causes a small CVT speed ratio, as shown in FIG. 17. A large CVT speed ratio corresponds to a small gyration angle of the power rollers 20, and a small CVT speed ratio corresponds to a large gyration angle of the same.

Due to the change of the step number STEP from the first value ASTEP to the second value BSTEP, the real gyration angle of the power rollers 20 which was in the hysteresis region $\Delta\phi$ of the figure, decreases to any value in the hysteresis region $\Delta\phi 1$ situated below the hysteresis region $\Delta\phi$. Subsequently, when the control unit 80 returns the step value STEP from the second value BSTEP to the first value ASTEP, the real gyration angle in the hysteresis region $\Delta\phi 1'$ also varies in an increasing direction but it does not exceed the first value ASTEP output to the step motor 36, and the real gyration angle of the power rollers 20 is precisely controlled to the gyration angle corresponding to the geared neutral point GNP.

In this way, after the real gyration angle of the power rollers 20 has been made to coincide with the GNP, when the power recirculation clutch 9 is engaged, and the step number STEP is varied in the decreasing direction of the gyration angle, a torque in the forward motion direction of the vehicle angle will definitely act on the drive wheels 11A, 11B of the vehicle due to the negative torque transmission of the CVT 2. Therefore, the offset of speed ratio due to the torque shift peculiar to the toroidal CVT 2 is compensated, and the vehicle can start smoothly.

In other words, shocks due to offset of speed ratio and the occurrence of an unintended creep torque can be definitively prevented.

Supply of oil to the oil chamber 9A of the power circulation clutch 9 begins immediately after the change-over from the N/P range to the D range, and the power recirculation clutch 9 is gradually engaged. The aforesaid change of step number is performed in parallel to this clutch operation. Even if the power recirculation clutch 9 is engaged before the step number STEP returns from BSTEP to ASTEP, the real gyration angle at the time of engaging will definitely be less than the geared neutral point GNP. Therefore, the difference between the real gyration angle and the gyration angle of the GNP causes a torque in the forward motion direction of the vehicle to act on the drive wheels 11A, 11B. In other words, even if the power recirculation clutch 9 is engaged before the step number STEP returns from BSTEP to ASTEP the IVT only exerts a torque on the drive wheels in the travel direction intended by the driver, and a torque opposite to that intended by the driver does not act on the drive wheels 11A, 11B.

Instead of setting the second value BSTEP so that the maximum value of the hysteresis region $\Delta\phi 1$ is equal to the minimum value of the hysteresis region $\Delta\phi$ corresponding to the first value ASTEP, it may be set to a smaller step number. In the N/P range, the real gyration angle of the power roller 20 is a value in the hysteresis region $\Delta\phi$ larger than the GNP. By changing the step number STEP to a value smaller than BSTEP in FIG. 8, the gyration angle will definitely vary below the GNP of FIG. 8. Hence, by making the step number STEP return to the first value ASTEP, the real gyration angle of the power roller 20 coincides precisely with the geared neutral point GNP corresponding to the first value ASTEP.

Next, referring to FIG. 11, the control will be described in the case where a change-over from the N/P range to the R range is detected when the vehicle is in the stationary state.

In this case also, the real gyration angle of the power roller 20 at the time when the change-over of the selector lever 86 is detected, may be any value in the hysteresis region $\Delta\phi$.

When there is a change-over from the N/P range to the R range, unlike the case when there is a change-over from the N/P range to the D range, the control unit 80 first changes the step number STEP to a larger third value CSTEP. As a result, the gyration angle of the power roller 20 changes to a value situated above the hysteresis region $\Delta\phi$ corresponding to the first value ASTEP. Subsequently, the control unit 80 changes the step number STEP to the second value BSTEP smaller than the first value ASTEP. Due to this operation, the real gyration angle coincides precisely with the gyration angle corresponding to the geared neutral point GNP, which is the maximum value of the hysteresis region $\Delta\phi 1$ of the second value BSTEP.

If the step number STEP is increased from this state, due to the positive torque transmission of the CVT 2, a torque in the reverse motion direction will definitively act on the drive wheels 11A, 11B of the vehicle. Therefore, the offset of speed ratio due to the torque shift peculiar to the toroidal CVT 2 is compensated, and the vehicle can start smoothly.

In other words, shocks due to offset of speed ratio and the occurrence of an unintended creep torque can be definitively prevented.

Oil pressure is supplied to the oil chamber 9A of the power recirculation clutch 9 immediately after the change-over from the N/P range to the R range, and the power recirculation clutch 9 is gradually engaged. The change of the step number STEP from ASTEP to CSTEP, and the change from CSTEP to BSTEP, are performed in parallel to this clutch operation. Even if the power recirculation clutch 9 is engaged while the step number STEP is changing from CSTEP to BSTEP, the real gyration angle at the time of engaging will definitely be larger than the gyration angle corresponding to the GNP. Therefore, the difference between the real gyration angle and the gyration angle corresponding to the GNP causes a torque in the reverse motion direction of the vehicle to act on the drive wheels 11A, 11B. In other words, even if the power recirculation clutch 9 is engaged while the step number STEP is changing from CSTEP to BSTEP, the IVT only exerts the torque on the drive wheels 11A, 11B in the travel direction intended by the driver, and a torque opposite to that intended by the driver does not act on the drive wheels 11A, 11B.

The third value CSTEP is set as follows.

Figure 11:
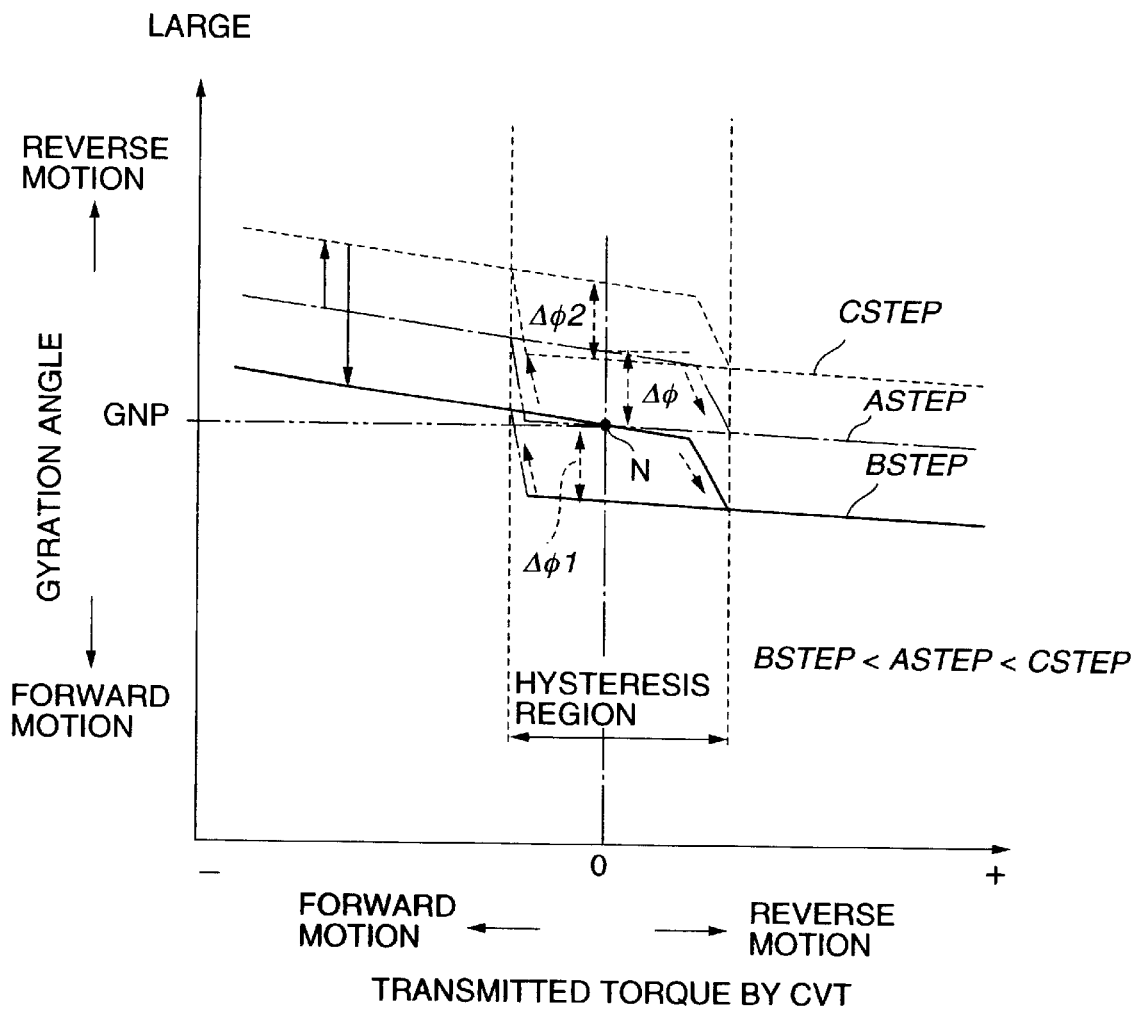
FIG. 11 is a diagram describing a relation of the transmission torque and gyration angle of the power rollers when there is a change-over from the N/P range to a R range.

The minimum value of the hysteresis region $\Delta\phi 2$ of the third value CSTEP shown in FIG. 11, is set larger than the maximum value of the hysteresis region $\Delta\phi 1$ of the second value BSTEP. The second value BSTEP is set so that the maximum value of the hysteresis region $\Delta\phi 1$ is equal to the geared neutral point GNP.

When the step number STEP is the first value ASTEP, the real gyration angle of the power roller 20 is situated inside the hysteresis region $\Delta\phi$. It is then shifted to the hysteresis region $\Delta\phi 2$ in FIG. 11 by varying the step number STEP to the third value CSTEP. Subsequently, if the step number STEP is changed to the second value BSTEP, the real gyration angle will definitely become equal to the largest value in the hysteresis region Δϕ1 of the second value BSTEP, i.e., to the geared neutral point GNP.

In FIG. 11, the step number STEP which enables the geared neutral point GNP in the N/P range was taken as the first value ASTEP, however it is also possible to set the second value BSTEP to correspond to the geared neutral point GNP. In this case, the step number STEP is first increased from the second value BSTEP to the first value ASTEP, then returned to the second value BSTEP. The first value ASTEP is set equal to or larger than the maximum value in the hysteresis zone Δϕ1 of the second value BSTEP.

Next, the routines used by the control unit 80 to perform the above control will be described referring to the flowcharts of FIGS. 12–14.

Figure 12:
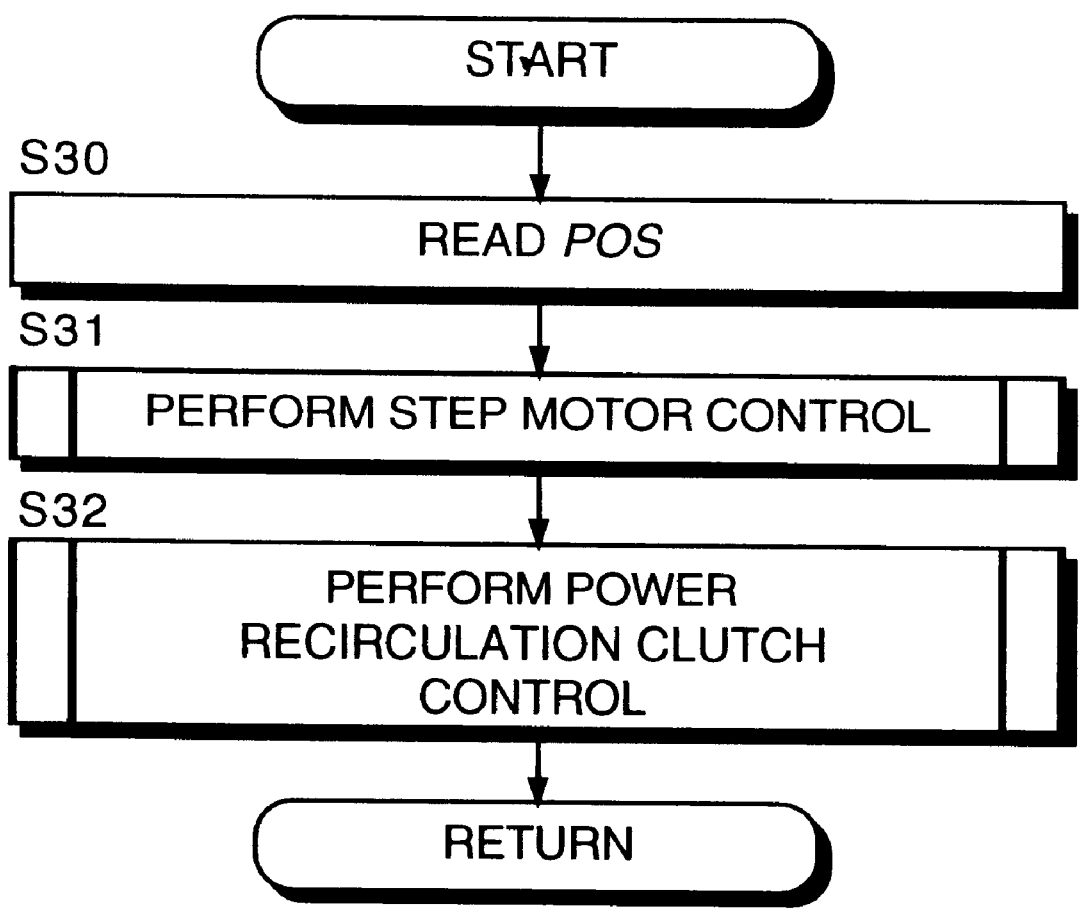
FIG. 12 is a flowchart describing a speed change control routine when a selection lever is operated, performed by a control unit according to this invention.

FIG. 12 shows a main routine. FIG. 13 shows a subroutine which controls the step motor 36 according to the changeover of the selector lever 86. FIG. 14 shows a subroutine which engages the power recirculation clutch 9 according to the change-over of the selector lever 86. These routines are performed at an interval of 10 milliseconds from when the vehicle has stopped to when the power recirculation clutch 9 is completely engaged.

Describing the main routine of FIG. 12, firstly in a step S30, the control unit 80 reads a shift position signal POS input from the inhibitor switch 84.

In a next step S31, the step number of the step motor 36 is temporarily increased or decreased based on the shift position signal POS.

In a next step S32, oil pressure control is performed to gradually engage the power recirculation clutch 9 based on the shift position signal POS.

Figure 13:
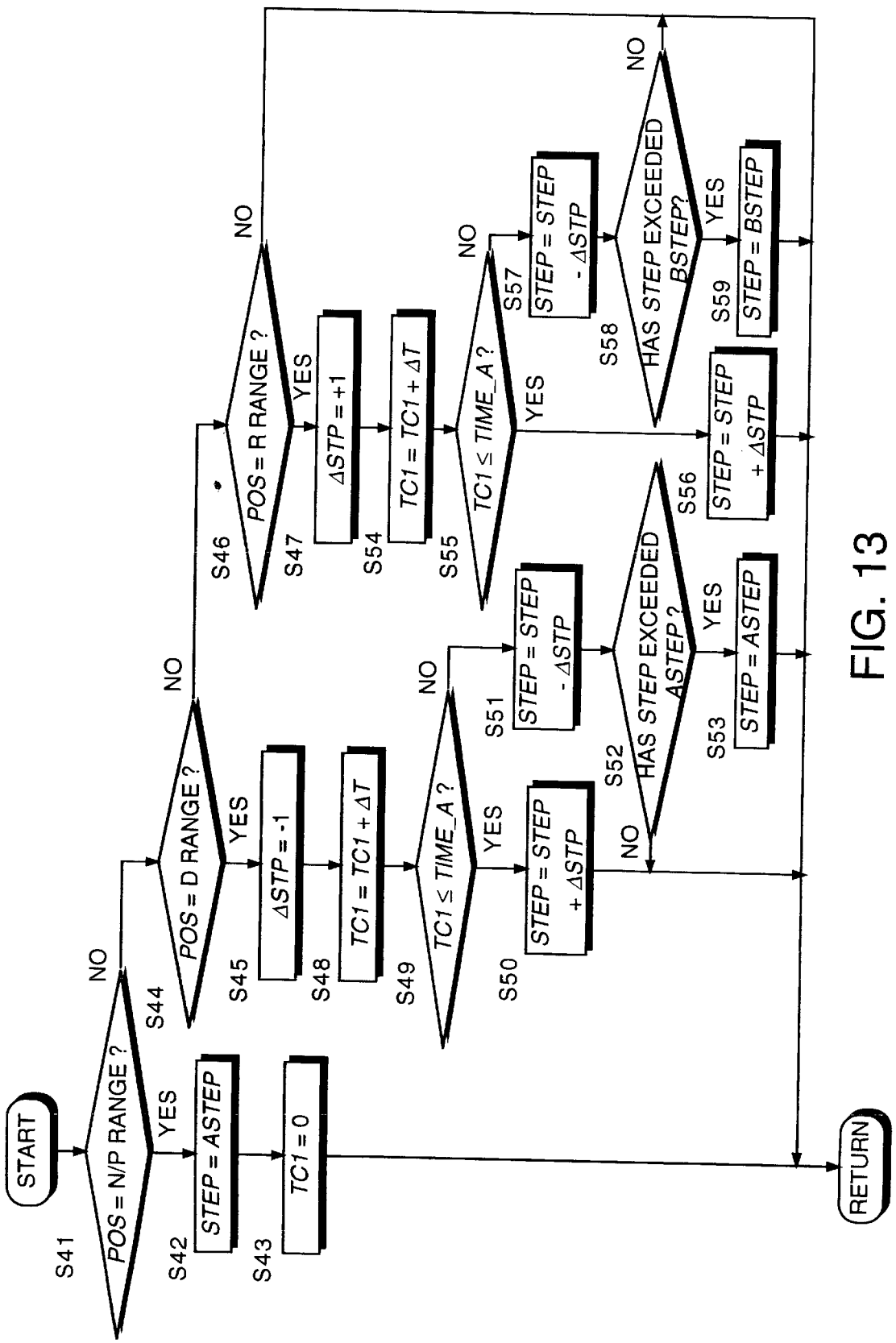
FIG. 13 is a flowchart describing a step motor control subroutine performed by the control unit.

The processing of the step S31 is performed by the subroutine shown in FIG. 13.

In this subroutine, the control unit 80 first determines whether or not the shift position signal POS shows the N/P range in a step S41. When the shift position signal POS shows the N/P range, the subroutine proceeds to a step S42 and performs processing for when the vehicle is in the stationary state. When the shift position signal POS shows a range other than the N/P range, the subroutine proceeds to a step S44, and performs processing for vehicle startup. As this subroutine is performed until the power recirculation clutch 9 is completely engaged as described above, when the shift position signal POS shows a range other than the N/P range, it shows that the selector lever 86 has just changed over from the N/P range to the D range or R range.

In the step S42, the step number STEP output to the step motor 36 is set to the first step number ASTEP corresponding to the geared neutral point GNP, a timer value TC1 is reset to 0 in a subsequent step S43 and the subroutine is terminated.

On the other hand, in the step S44, it is determined whether or not the shift position signal POS shows the D range. When the shift position signal POS shows the D range, the subroutine proceeds to a step S45.

In the step S45, an increase/decrease amount ΔSTP each time the routine for determining the step number STEP output to the step motor 36 is performed, is set to a predetermined negative value. The negative predetermined value may for example be −1. The increase/decrease amount ΔSTP is set to satisfy a criteria described later. Whether the increase/decrease amount ΔSTP is positive or negative depends on whether the step number STEP of the step motor 36 and the CVT speed ratio Ic are in the relation shown in FIG. 17.

In a next step S48, a value ΔT equivalent to the execution interval of the subroutine, which in this case is 10 milliseconds, is added to the timer value TC1.

In a next step S49, it is determined whether or not the timer value TC1 is less than a preset value TIME_A.

When the timer value TC1 is less than the preset value TIME_A, it is determined that the variation of the real gyration angle to outside the hysteresis region Δϕ of the first value ASTEP shown in FIG. 8 is not complete, and the subroutine proceeds to a step S50.

In the step S50, the increase/decrease amount ΔSTP set in the step S45 is added to the step number STEP, and the subroutine is terminated.

On the other hand, when the timer value TC1 exceeds the predetermined value TIME_A in the determination of the step S49, the subroutine proceeds to a step S51.

In the step S51, processing is performed to return the step number STEP to the first step number ASTEP. Specifically, the increase/decrease amount ΔSTP is subtracted from the step number STEP.

In a next step S52, it is determined whether or not the step number STEP exceeded the target value ASTEP. When the step number STEP has not exceeded the target value ASTEP, the routine is terminated without proceeding to further steps. In this case, the increase/decrease amount ΔSTP is again subtracted from the step number STEP in the step S51 on the next occasion the subroutine is executed.

When the step number STEP exceeds the target value ASTEP, the step number STEP is reset to ASTEP in a step S53, and the subroutine is terminated.

When the shift position signal POS is not showing the D range in the determination of the step S44, the subroutine proceeds to a step S46. Here, it is determined whether or not the shift position signal POS shows the R range. When the shift position signal POS shows the R range, the routine proceeds to a step S47. When the shift position signal POS does not show the R range, the subroutine is terminated without performing further processing. Herein, the case where the shift position signal POS does not show the R range is the case when, for example, the elector lever 86 is being operated and a specific range cannot be identified.

In the step S47, the increase/decrease amount ΔSTP each time the routine is executed corresponding to the step number STEP output to the step motor 36, is set to a positive predetermined value. This positive predetermined value is taken as, for example, +1.

The processing of the following steps S54–S57 is identical to that of the steps S49–S51.

In a step S58, it is determined whether are not the step number STEP exceeded the target value BSTEP. Here, when the step number STEP does not exceed the target value BSTEP, the routine is terminated without performing further processing. In this case, the increase/decrease amount ΔSTP is again subtracted from the step number STEP in the step S57 on the next occasion the subroutine is executed.

When the step number STEP exceeds the target value BSTEP, the step number STEP is reset to BSTEP in a step S59, and the subroutine is terminated.

In this subroutine, it is not determined whether or not the step number STEP has reached the second value BSTEP when the vehicle is moving forward, or whether or not the step number STEP has reached the third value CSTEP when the vehicle is reversing. In view of this point, the increase/decrease amount ΔSTP is set to a value equal to or greater than a value obtained by dividing the larger of (ASTEP- BSTEP) and (CSTEP-ASTEP) by the predetermined value TIME_A. By setting the increase/decrease amount ΔSTP to this value, even when the step number STEP is varied, the step number STEP can be definitively changed to the second value BSTEP when the vehicle is moving forward and to the third value CSTEP when the vehicle is reversing before the timer value TC1 reaches the predetermined value TIME_A.

Figure 14:
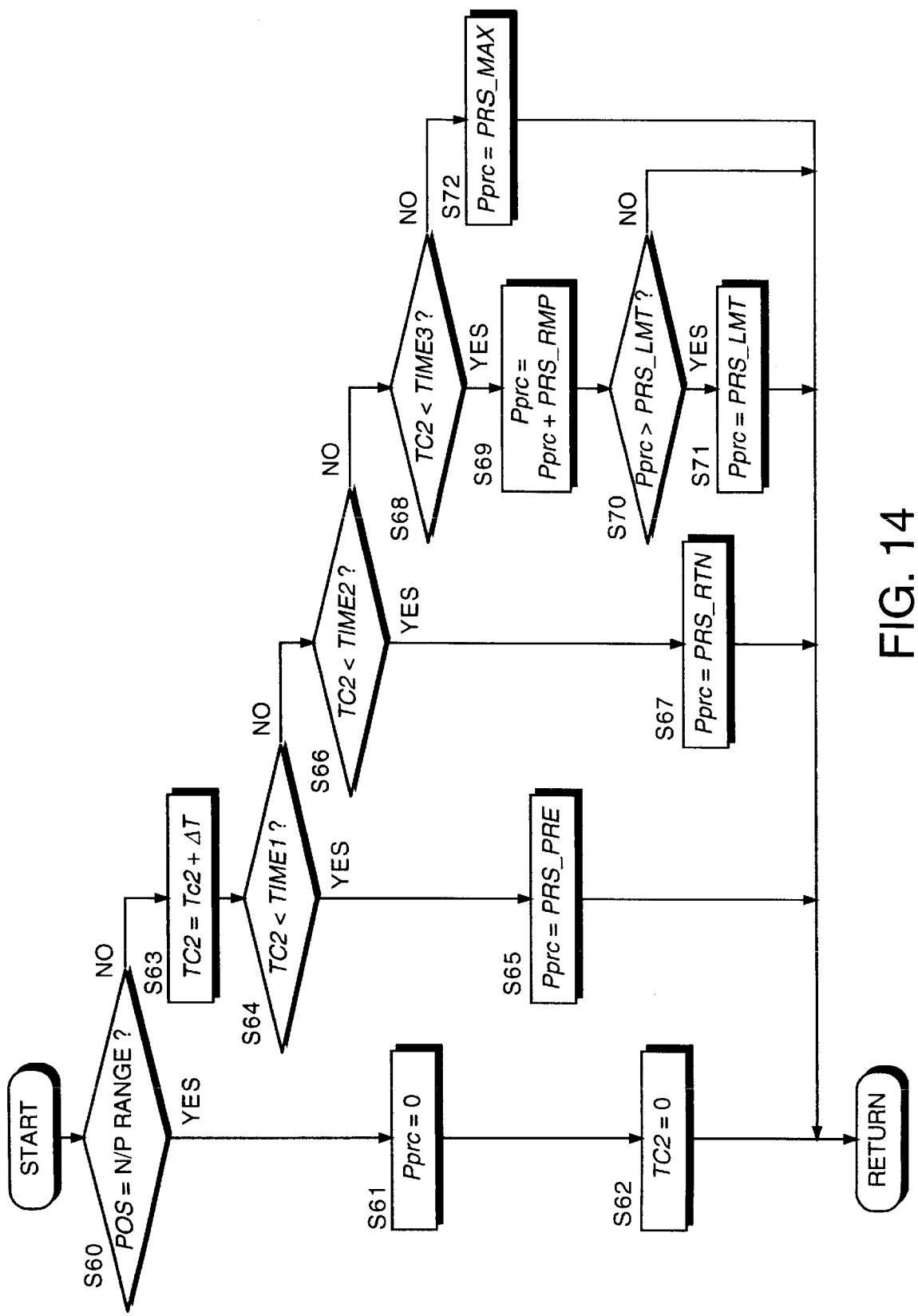
FIG. 14 is a flowchart describing a power recirculation clutch oil pressure control subroutine performed by the control unit.

The oil pressure control of the power recirculation clutch 9 performed in the step S32 of the main routine is performed by the subroutine shown in FIG. 14.

In this subroutine, it is first determined if the shift position signal POS shows the N/P range. When the shift position signal POS shows the N/P range, the subroutine proceeds to a step S61.

In the step S61, the clutch pressure Pprc supplied to the oil chamber 9A of the power recirculation clutch 9 is set to 0. In a next step S62, a timer value TC2 is reset to 0 and the subroutine is terminated.

In the step S60, when the shift position signal POS shows a range other than the N/P range, the subroutine proceeds to a step S63.

In the step S63, a value Δt corresponding to the execution interval of the subroutine, which in this case is 10 milliseconds, is added to the timer value TC2.

In a next step S64, it is determined whether or not the timer value TC2 has reached a first predetermined time TIME1.

When the timer value TC2 is less than first predetermined time TIME1, the subroutine proceeds to a step S65. When the timer value TC2 has reached the predetermined time TIME1, the subroutine proceeds to a step S66.

In the step S65, a clutch pressure Pprc is set to a predetermined precharge pressure PRS_PRE, and the subroutine is terminated.

Here, the precharge pressure PRS_PRE will be described.

In the N/P range, the clutch pressure Pprc is effectively 0. In this state, as shown in FIG. 2, the pressing member 9C of the power recirculation clutch 9 is pushed by the return spring 9B so that it withdraws to the right of the figure, and separates from the disk 9D. To make the operation of the power recirculation clutch 9 follow the command signal from the control unit 80 to the solenoid 91 without any delay, a pressure PRS_RTN corresponding to the pressing force of the return spring 9B must be applied to the oil chamber 9A, and the pressing member 9C and disk 9D must be brought into a state immediately prior to contact, before the engaging of the power recirculation clutch 9 takes place.

However, when the clutch pressure is close to 0, due to the response delay of the control valve 94, some time is required for the clutch pressure supplied by the control valve 94 to the oil chamber 9A to reach the pressure PRS_RTN even if the solenoid 91 outputs a signal pressure corresponding to the pressure PRS_RTN to the control valve 94. The control unit 80 therefore energizes the solenoid 91 so that a signal pressure corresponding to a large precharge pressure PRS_PRE is output by the solenoid 91 to the control valve 94, as shown by the solid lines in FIGS. 15 and 16. As a result, the clutch pressure supplied from the control valve 94 to the oil chamber 9A rises quickly, as shown by the broken line in the figure.

It should be noted that in the determination of the step S49 of FIG. 13, the predetermined value TIME_A used for comparing with the timer value TC1, is set to a value smaller than the first predetermined time TIME1.

In a step S66, it is determined whether or not the timer value TC2 has reached the second predetermined time TIME2.

When the timer value TC2 is less than the second predetermined time TIME2, the subroutine proceeds to a step S67. When the timer value TC2 has reached the second predetermined time TIME2, the subroutine proceeds to a step S68.

In the step S67, the clutch pressure Pprc is set to the pressure PRS_RTN corresponding to the pressing force of the return spring 9B, and the subroutine is terminated.

On the other hand, in the step S68, it is determined whether or not the timer value TC2 has reached a third predetermined time TIME3.

When the timer value TC2 is less than the third predetermined time TIME3, the subroutine proceeds to a step S69. When the timer value TC2 has reached the third predetermined time TIME3, the subroutine sets the clutch pressure Pprc to a preset upper limiting pressure PRS_MAX in a step S72, and then terminates. Thereafter, control of the power recirculation clutch 9 for normal running is performed by a different routine. Likewise, the control of the step number STEP of the step motor 36 also shifts to a different routine for normal running.

In the step S69, a predetermined incremental value PRS_RMP is added to the current clutch pressure Pprc.

In a next step S70, it is determined whether or not the clutch pressure Pprc exceeded a preset engaging pressure PRS_LMT. When the clutch pressure Pprc does not exceed the preset engaging pressure PRS_LMT, the subroutine is terminated without performing other steps. When the clutch pressure Pprc exceeds the preset engaging pressure PRS_LMT, the clutch pressure Pprc is set to the engaging pressure PRS_LMT in a step S71, and the subroutine is terminated. The engaging pressure PRS_LMT means the pressure when the power recirculation clutch 9 is fully engaged.

Due to the above processing, after the timer value TC2 passes the second predetermined time TIME2?, the clutch pressure Pprc rises from the pressure PRS_RTN corresponding to the return spring towards the engaging pressure PRS_LMT in increments of PRS_RMP each time the subroutine is executed. Consequently, the engaging force of the power recirculation clutch 9 gradually increases from the time TIME2 shown in FIG. 15, and as the power recirculation clutch 9 gradually increases the transmission torque, the vehicle can be started smoothly without stalling the engine.

The clutch pressures Pprc set at the times TIME1, TIME2 and TIME3 are in the relation PRS_RTN<PRS_PRE<PRS_LMT<PRS_MAX, as shown in the figure. The time TIME3 is set to the order of one second from the time T=0 when the selector lever 86 is changed over from the N/P range to the D range.

On the other hand, the time TIME_A at which the step number STEP is equal to or smaller than the second value BSTEP in FIG. 8, is set before the time TIME1 at which the clutch pressure Pprc reaches the precharge pressure PRS_PRE. Further, the time TIME_A is set so that the step number STEP returns to a value corresponding to the geared neutral point GNP before the time TIME2 at which the clutch pressure Pprc begins increasing from the return pressure PRS_RTN toward the engaging pressure PRS_RMP. The time TIME1 when the clutch pressure Pprc reaches the precharge pressure PRS_PRE is set to approximately 30–50 milliseconds.

Due to the above settings, when the D range is selected from the N/P range to start the vehicle, as shown in FIGS.

15A–15D, the gyration angle of the power roller 21 first moves outside the hysteresis region during the precharge period, the gyration angle of the power rollers 20 is made to coincide precisely with the gyration angle corresponding to the GNP by returning the step number STEP to the first value ASTEP, and the engaging force of the power recirculation clutch 9 is then generated. Therefore, the vehicle can be started in a forward direction while fluctuation of transmission torque due to hysteresis is definitely prevented.

Similarly, when the R range is selected from the N/P range to reverse the vehicle, as shown in FIG. 16, the step number STEP is first changed to the third value CSTEP during the precharge period, the gyration angle of the power rollers 20 is made to coincide precisely with the gyration angle corresponding to the GNP by returning to the second value BSTEP corresponding to the GNP, and then the engaging force of the power recirculation clutch 9 is generated. Therefore, the vehicle can be started in a reverse direction while definitively preventing fluctuation of transmission torque due to hysteresis.

In the aforesaid embodiment, priority was given to control of the clutch pressure Pprc, however the same desirable effect may be obtained even in a routine where control of the clutch pressure Pprc is performed after the temporary increase/decrease of the step number STEP has terminated. Further, fluctuation of transmission torque in the vicinity of the geared neutral point GNP due to hysteresis can be still more definitively prevented by setting BSTEP and CSTEP to be large.

Next, a second embodiment of this invention will be described referring to FIG. 18.

In this embodiment, instead of temporarily varying the step number STEP outside the hysteresis region, the gyration angle of the power rollers 20 is set outside the hysteresis region so that the IVT generates a transmission torque in the starting direction of the vehicle before engaging the power recirculation clutch for starting. Specifically, when a change-over is detected from the N/P range to the D range, the step number STEP is set to a predetermined small target value SN from the first step number ASTEP corresponding to the GNP.

In this embodiment, when the power recirculation clutch 9 is engaged, a torque TI1 is immediately transmitted. For this reason, the increase of clutch pressure of the power recirculation clutch 9 during the interval from the time TIME2 to the time TIME3 shown in FIGS. 15A–15D and FIGS. 16A–16D is made more gradual so as to mitigate shocks due to abrupt transmission of torque. In other words, (TIME3–TIME2) is set to a value larger than that in the first embodiment. Due to this setting, the vehicle can be started smoothly while definitively preventing fluctuations of transmission torque due to hysteresis.

Figure 18:
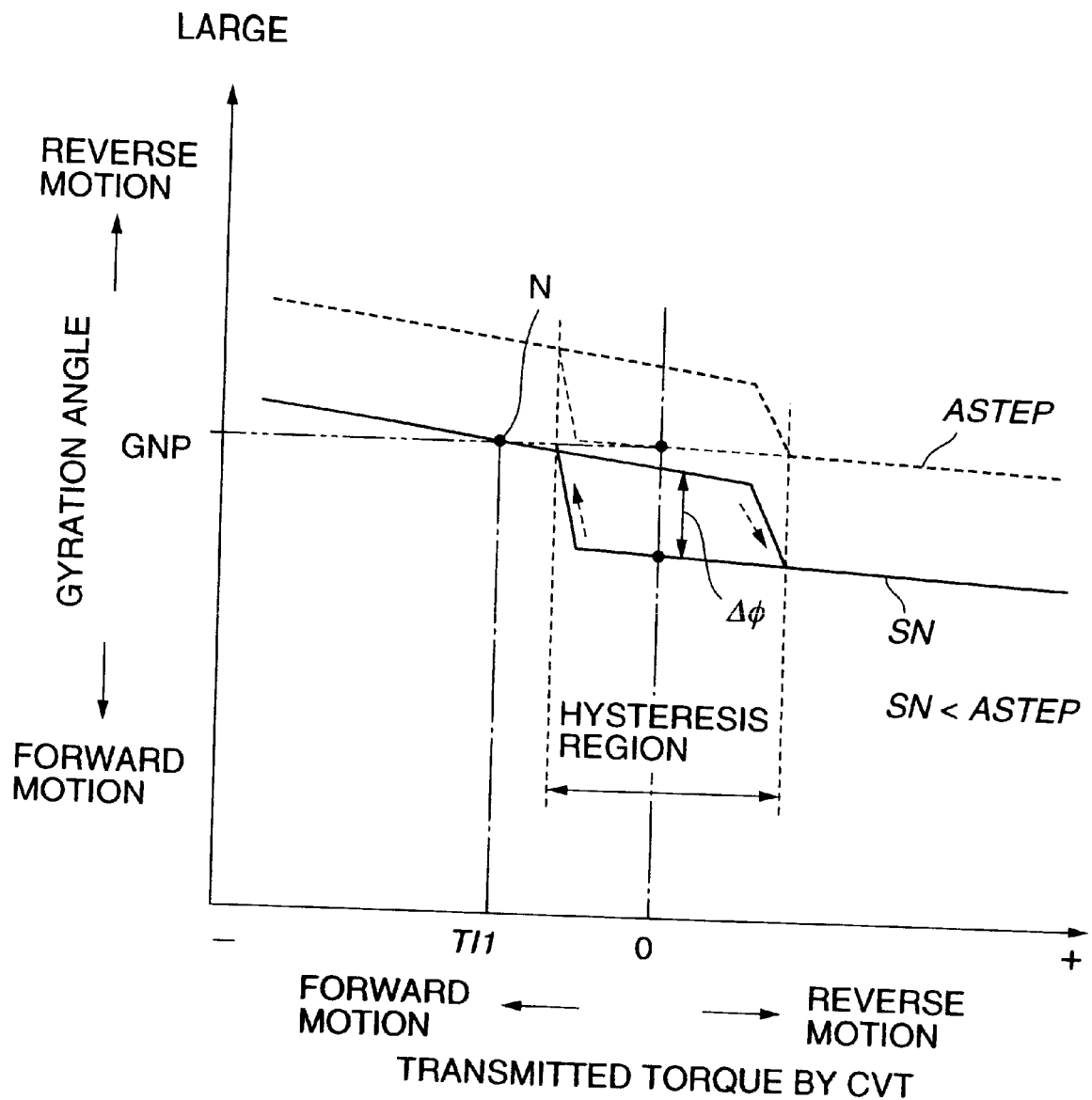
FIG. 18 is a diagram describing a relation between the transmission torque and gyration angle of the power rollers when there is a change-over from the N/P range to the D range, according to a second embodiment of this invention.

FIG. 18 shows the setting of the step number STEP when the vehicle is moving forward, but the step number STEP is set to a value larger than the GNP by a predetermined amount when the vehicle is reversing. In this case also, by making the clutch pressure Pprc of the power recirculation clutch 9 increase more gradually than in the first embodiment, the vehicle can be started smoothly while definitively preventing fluctuations of transmission torque due to hysteresis, as when the vehicle is moving forwards.

In this embodiment also, the control routine of FIGS. 12–14 described in the first embodiment are used, but the steps S51–S53 and S57–S59 are omitted from the control subroutine of the step motor 36 of FIG. 13. Further, the value of ΔSTP is determined based on the difference between the target value SN and the first value ASTEP.

Next, a third embodiment of this invention will be described referring to FIGS. 19 and 20.

Figure 19:
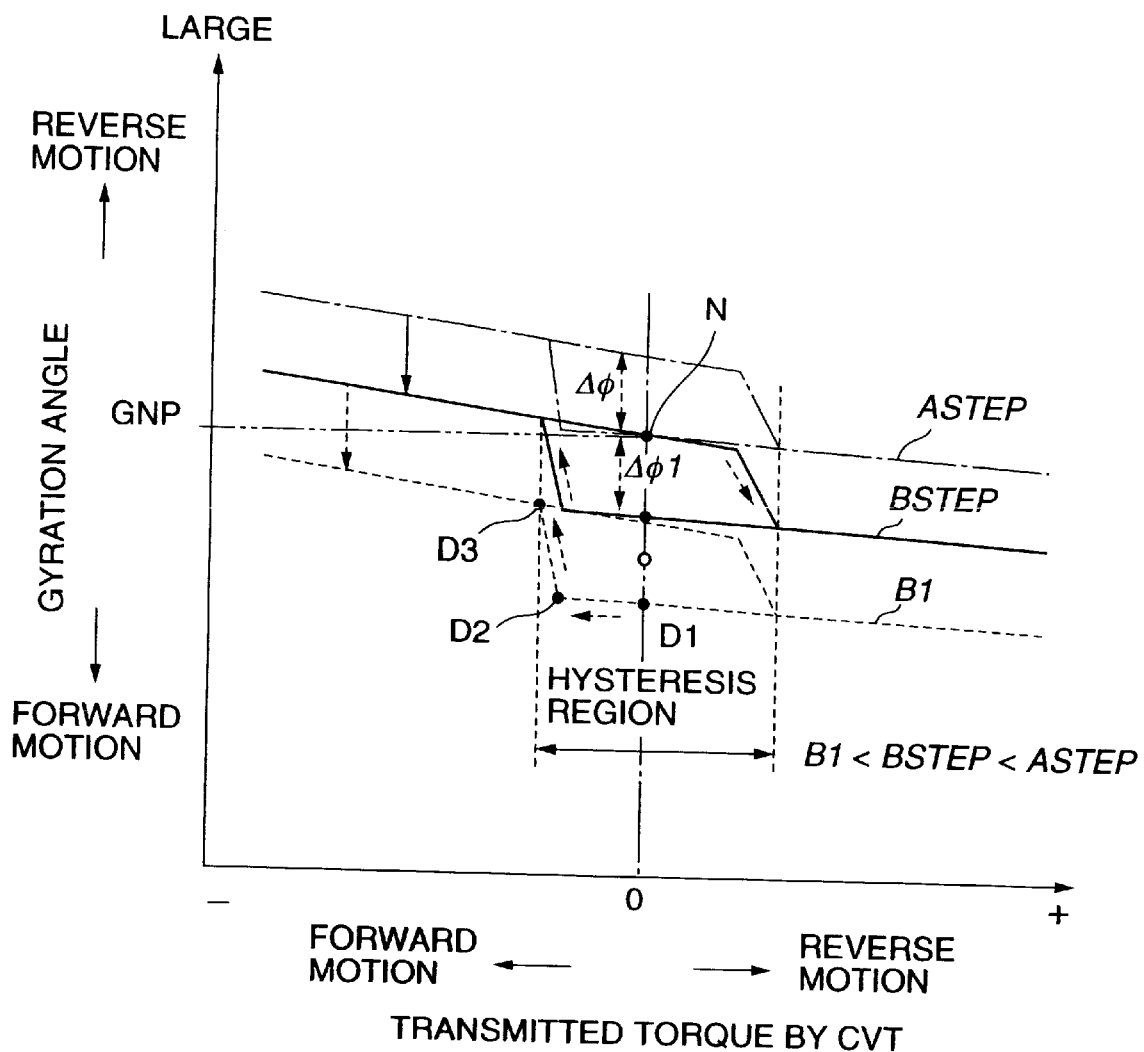
FIG. 19 is a diagram describing a relation between the transmission torque and gyration angle of the power rollers when there is a change-over from the N/P range to the D range, according to a third embodiment of this invention.
Figure 20:
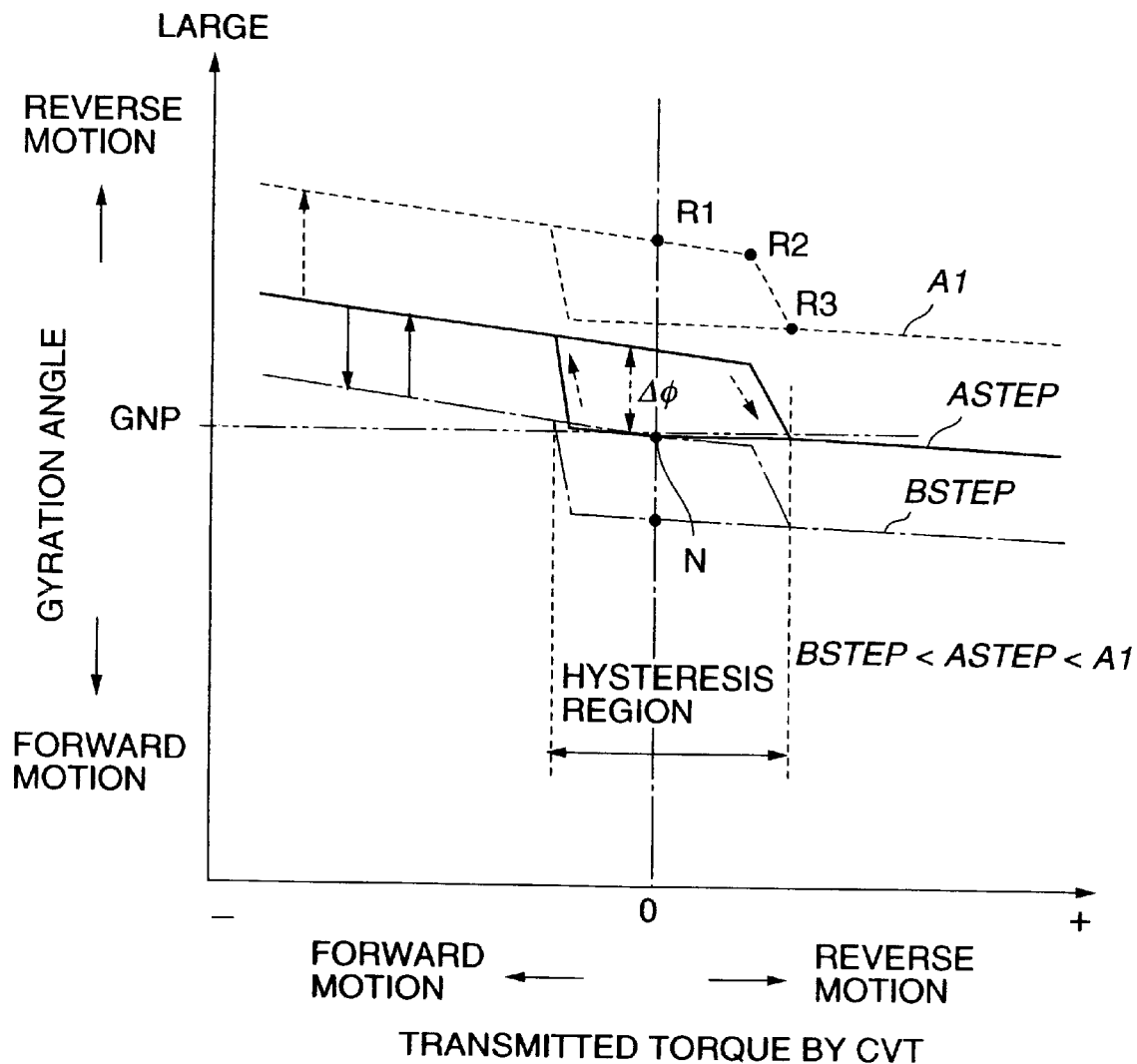
FIG. 20 is a diagram describing a relation between the transmission torque and gyration angle of the power rollers when there is a change-over from the N/P range to the R range, according to the third embodiment of this invention.

In this embodiment, when a change-over is detected from the N/P range to the D range, the control unit 80 decreases the step number STEP to the second step number BSTEP from the step number ASTEP, as shown in FIG. 19. Subsequently, the vehicle is started by engaging the power recirculation clutch 9. Herein, the first step number ASTEP and second step number BSTEP are set identically to the first embodiment.

At the first step number ASTEP, the real gyration angle of the power roller 20 is situated at a position inside the hysteresis region Δφ. By changing the step number STEP to the second step number BSTEP, the real gyration angle is changed to a maximum value in the hysteresis region Δφ1 of the second value BSTEP. Therefore, if the power recirculation clutch 9 is engaged while decreasing the step number STEP from this state, the IVT will definitively exert a torque in the forward motion direction on the drive wheels 11A, 11B.

For example, if the engaging force of the power recirculation clutch 9 is gradually increased while the step number STEP is decreased to B1 in the figure, the negative transmission torque of the CVT 2 gradually increases from a point D1 to a point D3 via a point D2. When the brake pedal is depressed and the vehicle is in the stationary state, this transmission torque acts as a creep torque in the forward motion direction. In this state, creep torque may be adjusted by controlling the engaging force of the power recirculation clutch 9.

Further, when the power recirculation clutch 9 is gradually released from the point D3 in FIG. 19, the transmission torque of the CVT 2 changes from the point D3 to the point D1 via the point D2, and the creep torque can be decreased according to the decrease of the clutch pressure Pprc of the power recirculation clutch 9.

In this way, according to this embodiment, creep torque control when the vehicle is moving forward can be performed with high reproducibility.

Next, referring to FIG. 20, the control of the step number STEP performed by the control unit 80 in this embodiment when a change-over is detected from the N/P range to the R range will be described.

In this case, the step number is decreased from the first value ASTEP corresponding to the geared neutral point GNP to the second step number BSTEP, and again returned to the step number ASTEP. Hence, the real gyration angle of the power roller 20 which was at a position inside the variation region Δφ of the step number ASTEP when the vehicle is in the stationary state, is made to coincide with the minimum value of the hysteresis region Δφ of the first value ASTEP.

If the clutch pressure Pprc of the power recirculation clutch 9 is increased from this state while increasing the step number STEP, the IVT will definitively exert a torque in the reverse motion direction on the drive wheels 11A, 11B.

For example, if the engaging force of the power recirculation clutch is gradually increased when the step number STEP has been increased from the first step number ASTEP to A1 in the figure, the positive transmission torque of the CVT 2 gradually increases from the point R1 to the point R3 via the point R2. When the brake pedal is depressed while the vehicle is in the stationary state, the transmission torque acts as a creep torque in the reverse motion direction. In this state, control of the creep torque can be performed by controlling the engaging force of the power recirculation clutch 9 in this state.

Further, if the power recirculation clutch 9 is gradually released from the point R3, the transmission torque of the CVT 2 changes from the point D3 to the point D1 via the point D2, and the creep torque can be decreased according to the decrease of the clutch pressure Pprc of the power recirculation clutch 9.

In this embodiment, the control routines of FIGS. 12–14 described in the first embodiment are used, but the steps S51–S53 of the control subroutine of the step motor 36 of FIG. 13 are omitted. Further, BSTEP of the steps S58 and S59 is replaced by ASTEP. Further, ΔSTP set in the steps S45 and S47 is determined based on (ASTEP-BSTEP) and TIME_A.

In this way, according to this embodiment, the creep torque can be controlled with high reproducibility even when the vehicle is reversing.

Next, a fourth embodiment of this invention will be described referring to FIGS. 21 and 22.

According to this embodiment, the vehicle is started at a point where the transmission torque of the CVT 2 is a maximum in the hysteresis region.

In the N/P range, as in the case of the first embodiment, the control unit 80 maintains the step number STEP at the first step number ASTEP corresponding to the geared neutral point GNP.

Figure 21:
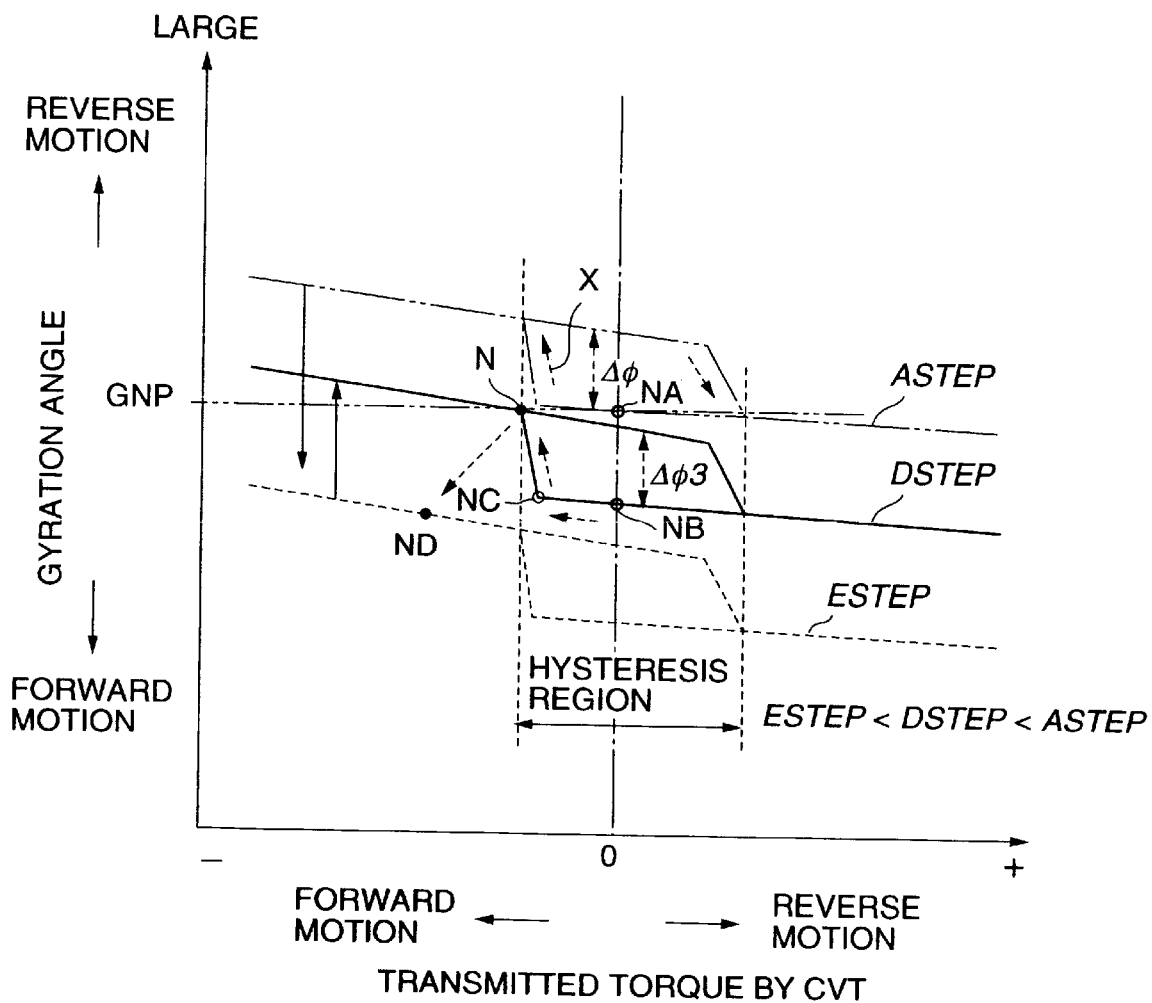
FIG. 21 is a diagram describing a relation between the transmission torque and gyration angle of the power rollers when there is a change-over from the N/P range to the D range, according to a fourth embodiment of this invention.

Referring to FIG. 21, when a change-over is detected from the N/P range to the D range, the control unit 80 decreases the step number STEP from the first number ASTEP to a fourth step number ESTEP shown by a broken line in the figure. Subsequently, the step number STEP is increased to a fifth step number DSTEP, and engaging of the power recirculation clutch 9 begins in this state.

The fifth step number DSTEP is set to a value at which the negative transmission torque of the CVT 2 in the hysteresis region is a maximum at the geared neutral point GNP, i.e., to a value such that a point N in FIG. 21 corresponds to the geared neutral point GNP.

The fourth step number ESTEP is a small value than the fifth step number DSTEP, and is set so that the hysteresis region of the fifth step number DSTEP does not overlap with that of the fourth step number ESTEP.

At the first step number ASTEP, the real gyration angle of the power rollers 20 was situated inside the hysteresis region Δϕ. It is first decreased to the fourth step number ESTEP, and then returned to the fifth step number DSTEP. In this way, it is made to coincide with a point NB in the figure corresponding to the minimum value of the hysteresis region Δϕ3 of the fifth step number DSTEP.

The real gyration angle of the power rollers 20 when the step number STEP is situated at the point NB, is less than the real gyration angle at a point NA corresponding to the geared neutral point GNP shown in the figure.

When the power recirculation clutch 9 is gradually engaged, when the vehicle is in the stationary state, the IVT speed ratio is forcibly changed to the geared neutral point GNP. As a result, the real gyration angle of the power rollers 20 traces the outer circumference of the hysteresis region Δϕ3 of the fifth step number DSTEP, and changes from the point NB to the point N corresponding to the geared neutral point GNP via a point NC.

Hence, by controlling the clutch pressure Pprc of the power recirculation clutch 9, the vehicle can definitively be started from the real gyration angle corresponding to the geared neutral point GNP while avoiding the hysteresis region Δϕ3. Further, by decreasing the step number STEP from the point N, the IVT definitively exerts a torque in the forward motion direction on the drive wheels 11A, 11B.

After the vehicle starts, if for example the step number STEP is decreased from the fifth step number DSTEP to the fourth step number ESTEP, the real gyration angle of the power roller 20 shifts from the point N to the point ND. Therefore, speed ratio control can be performed without being affected by fluctuation of transmission torque.

However, when the vehicle is started moving forward, the following problem arises when control of the gyration angle begins from the point NA in FIG. 21.

When the step number STEP is set to the first value ASTEP corresponding to the point NA, the real gyration angle of the power roller 20 is at a point in the hysteresis region Δϕ of the figure. Hence, when the step number STEP is simply decreased in the forward motion direction from the first value ASTEP, it may occur that the real gyration angle is still situated in a region for reversing when the power recirculation clutch 9 begins transmitting torque.

For example, if the power recirculation clutch 9 starts engaging when the real gyration angle coincides with the point NA, the transmission torque of the CVT 2 passes through a sharply inclined interval X in the figure, and if the step number STEP is not rapidly reduced, a torque will act on the drive wheels 11A, 11B in the reverse motion direction.

According to this embodiment, when a change-over is detected from the N/P range to the D range, the real gyration angle of the power rollers 20 is made to coincide with the point NB by the aforesaid method. The power recirculation clutch 9 starts engaging from this state, and the step number STEP is decreased from the point N to start the vehicle. Thus, the sharply inclined interval NC-N has already been passed, so the operating speed of the step motor 36 may be determined according to the step number and input torque, and there is no need to increase the drive speed of the step motor 36 to cope with the sharply inclined interval.

Next, referring to FIG. 22, the control will be described when a change-over is detected from the N/P range to the R range.

In the N/P range when the vehicle is in the stationary state, the control unit 80 maintains the step number STEP at the first step number ASTEP corresponding to the geared neutral point GNP as in the case of FIG. 21.

When a change-over is detected from the N/P range to the D range, the controller 80 first increases the step number STEP of the step motor 36 to a sixth step number GSTEP shown by the broken line in the figure. Subsequently, the step number STEP is returned to a seventh step number FSTEP.

In the N/P range, the real gyration angle of the power roller 20 is situated at a point in the hysteresis region Δϕ of the step number ASTEP, and the real gyration angle is made to coincide with the point NB corresponding to the maximum value of the hysteresis region Δϕ4 the seventh step number FSTEP by first increasing the step number STEP to the sixth step number GSTEP, and then returning it to the seventh step number FSTEP.

Figure 22:
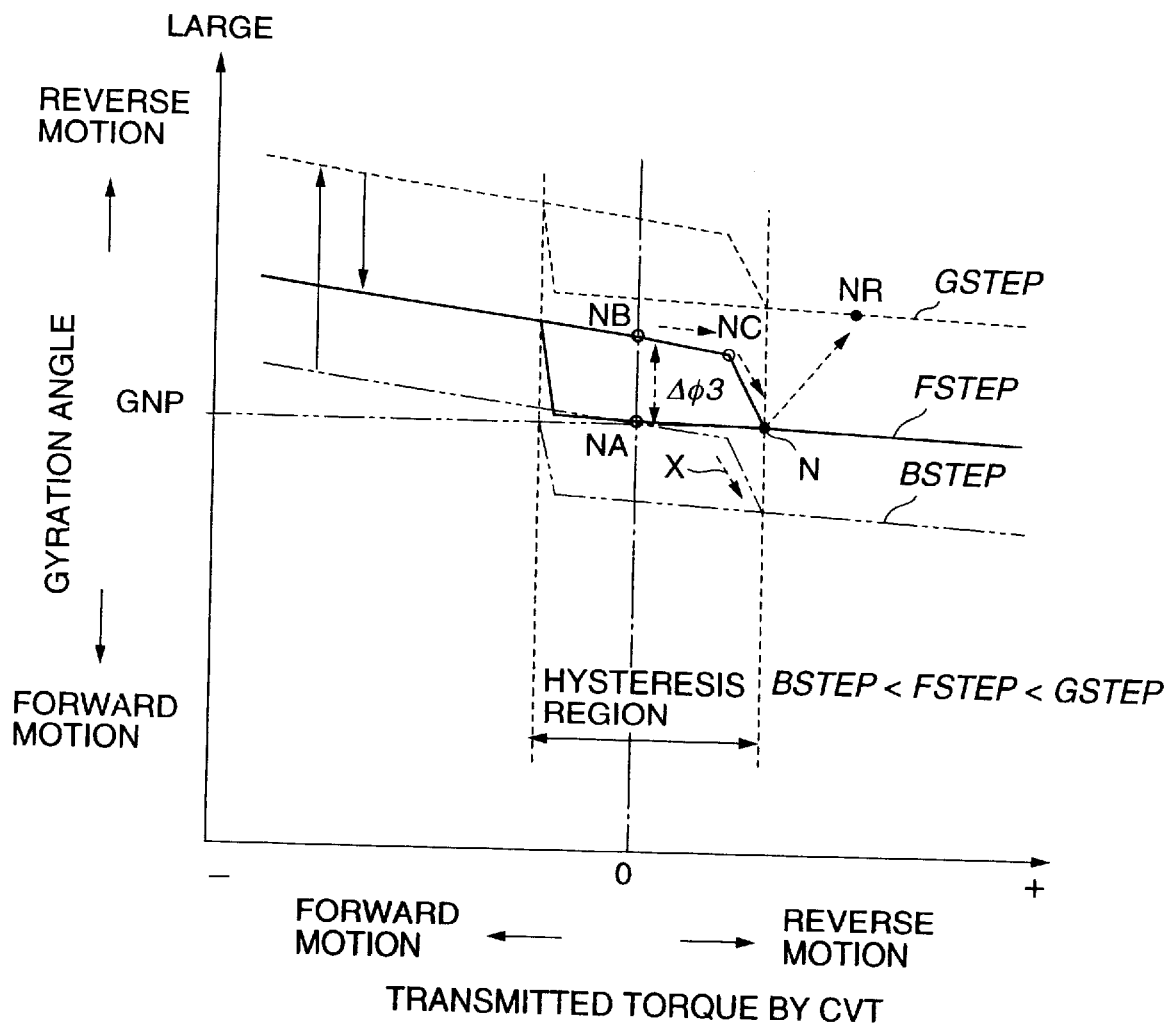
FIG. 22 is a diagram describing a relation between the transmission torque and gyration angle of the power rollers when there is a change-over from the N/P range to the R range, according to the fourth embodiment of this invention.

The seventh step number FSTEP is set to a value at which the positive transmission torque of the CVT 2 in the hysteresis region Δϕ4 is maximum at the geared neutral point GNP, i.e., to a value at which the point N in FIG. 22 corresponds to the geared neutral point GNP.

The sixth step number GSTEP is a value larger than the seventh step number FSTEP, and is set such that the hysteresis region of the sixth step number GSTEP does not overlap with that of the seventh step number FSTEP.

The real gyration angle of the power rollers 20 is offset towards the reversing direction from the geared neutral point GNP.

When the power recirculation clutch 9 is gradually engaged from this state, while the vehicle is in the stationary state, the IVT ratio must be the geared neutral point GNP, so the real gyration angle of the power roller 20 traces the outer circumference of the hysteresis region of the seventh step number FSTEP and moves from the point NB to the point N set to the geared neutral point GNP via the point NC.

If the step number STEP is increased from this point N, the gyration angle of the power roller 20 will move for example to a point Nr, i.e., it will definitively move in the reverse direction from the geared neutral point GNP without passing through the hysteresis region.

In this case also, as in the case of forward motion, at the pointer N where the vehicle starts, the sharply inclined region NC-N has already been passed, so the operating speed of the step motor 36 may be determined according to the step number and input torque, and there is no need to increase the drive speed of the step motor 36 to cope with the sharply inclined interval.

According to this embodiment, the control routine of FIGS. 12–14 described in the first embodiment is used, but ASTEP in the steps S52, S53 is replaced by DSTEP. Further, BSTEP in the steps S58, S59 is replaced by FSTEP.

Further, ΔSTP set in the step S45 is determined based on (ASTEP–ESTEP) and TIME__A. ΔSTP set in the step S47 is determined based on (GSTEP–ASTEP) and TIME__A.

In this embodiment, the point N was set as the end point of the hysteresis region, but the same effect is obtained if the point N is set outside the hysteresis region.

According to this embodiment, there is no need to increase the operating speed of the step motor 36 to deal with the sharply inclined interval X in the hysteresis region. Therefore, a compact step motor may be used as the step motor 36.

The contents of Tokugan Hei P11-201345 with a filing date of Jul. 15, 1999 in Japan are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A speed change controller for an infinite speed ratio transmission for a vehicle, the infinite speed ratio transmission comprising an input shaft, a continuously variable transmission which transmits a rotation speed of the input shaft to a first output shaft at an arbitrary speed ratio, a fixed speed ratio transmission which transmits the rotation speed of the input shaft to a second output shaft at a fixed speed ratio, a planetary gear set comprising a first rotation element joined to the first output shaft, a second rotation element, and a third rotation element which varies a rotation direction and a rotation speed according to a difference of a rotation speed of the first rotation element and a rotation speed of the second rotation element, and a clutch joining the second output shaft and second rotation element, the controller comprising:

a selector lever which selects one of a stationary range, forward motion range and reverse motion range;

a sensor which detects a range selected by the selector lever;

an actuator which varies the speed ratio of the continuously variable transmission according to an operating position; and a microprocessor programmed to:

determine whether or not the range selected by the selector lever has changed from the stationary range to one of the forward motion range and the reverse motion range;

change the operation position of the actuator to a predetermined position when the range selected by the selector lever has changed from the stationary range to one of the forward motion range and the reverse motion range, the predetermined position being different from a position corresponding to a geared neutral point at which a rotation speed of the third rotation element becomes zero; and change the operation position of the actuator from the predetermined position to the position corresponding to the geared neutral point.

2. The speed change controller as defined in claim 1, wherein the operating position of the actuator has a hysteresis region with respect to the speed ratio of the continuously variable transmission, and the temporary position is set to a position corresponding to a boundary part of the hysteresis region.

3. The speed change controller as defined in claim 2, wherein the microprocessor is further programmed to determine to which motion range the range selected by the selector lever has changed from the stationary range, when the range selected by the selector lever is determined to have changed from the stationary range to one of the forward motion range and the reverse motion range, set the predetermined position such that the continuously variable transmission transmits torque in a forward motion direction when the range selected by the selector lever has changed to the forward motion range, and set the predetermined position such that the continuously variable transmission transmits torque in a reverse motion direction when the range selected by the selector lever has changed to the reverse motion range.

4. The speed change controller as defined in claim 1, wherein the microprocessor is further programmed to disengage the clutch when the range selected by the selector lever is the stationary range, and engage the clutch after the operation position of the actuator has been changed from the predetermined position to the position corresponding to the geared neutral point.

5. A speed change controller for an infinite speed ratio transmission for a vehicle, the infinite speed ratio transmission comprising an input shaft, a continuously variable transmission which transmits a rotation speed of the input shaft to a first output shaft at an arbitrary speed ratio, a fixed speed ratio transmission which transmits the rotation speed of the input shaft to a second output shaft at a fixed speed ratio, a planetary gear set comprising a first rotation element joined to the first output shaft, a second rotation element, and a third rotation element which varies a rotation direction and a rotation speed according to a difference of a rotation speed of the first rotation element and a rotation speed of the second rotation element, and a clutch joining the second output shaft and second rotation element, the controller comprising:

a selector lever which selects one of a stationary range, forward motion range and reverse motion range;

a sensor which detects a range selected by the selector lever;

an actuator which varies the speed ratio of the continuously variable transmission according to an operating position, the operating position having a hysteresis region with respect to the speed ratio of the continuously variable transmission according to a transmission torque of the continuously variable transmission; and a microprocessor programmed to:

disengage the clutch when the range selected by the selector lever is the stationary range;

maintain the actuator at an operating position corresponding to a geared neutral point at which the rotation speed of the third rotation element is zero, when the range selected by the selector lever is the stationary range;

determine whether or not the range selected by the selector lever has changed from the stationary range to one of the forward motion range and the reverse range;

change the operation position of the actuator from the operating position corresponding to the geared neutral point to a first position when the range selected by the selector lever has changed from the stationary range to one of the forward motion range and reverse motion range; and change the operation position of the actuator from the first position to a second position;

wherein the second position corresponds to an operating position of the actuator which is displaced from the operating position corresponding to the geared neutral point in a direction represented by the range selected by the selector lever, and which realizes the geared neutral point when the clutch is engaged, and wherein the first position corresponds to an operating position of the actuator which is further displaced from the second position in the direction represented by the range selected by the selector lever.

6. The speed change controller as defined in claim 5, wherein the second position is set, when the range selected by the selector lever has changed from the stationary range to the forward motion range, to a position which corresponds to a larger speed ratio of the continuously variable transmission than a speed ratio corresponding to the geared neutral point, and is set, when the range selected by the selector lever has changed from the stationary range to the reverse motion range, to a position which corresponds to a smaller speed ratio of the continuously variable transmission than the speed ratio corresponding to the geared neutral point.

7. A speed change controller for an infinite speed ratio transmission for a vehicle, the infinite speed ratio transmission comprising an input shaft, a continuously variable transmission which transmits a rotation speed of the input shaft to a first output shaft at an arbitrary speed ratio, a fixed speed ratio transmission which transmits the rotation speed of the input shaft to a second output shaft at a fixed speed ratio, a planetary gear set comprising a first rotation element joined to the first output shaft, a second rotation element, and a third rotation element which varies a rotation direction and a rotation speed according to a difference of the rotation speed of the first rotation element and a rotation speed of the second rotation element, and a clutch joining the second output shaft and second rotation element, the controller comprising:

a selector lever which selects one of a stationary range, forward motion range and reverse motion range;

a sensor which detects a range selected by the selector lever;

an actuator which varies the speed ratio of the continuously variable transmission according to an operating position, the operating position having a hysteresis region with respect to the speed ratio of the continuously variable transmission according to a transmission torque of the continuously variable transmission; and a microprocessor programmed to:

disengage the clutch when the range selected by the selector lever is the stationary range;

determine whether or not the range selected by the selector lever has changed from the stationary range to one of the forward motion range and reverse motion range;

change the operation position of the actuator to a predetermined position when the range selected by the selector lever has changed from the stationary range to one of the forward motion range and reverse motion range, the predetermined position corresponding to an operating position of the actuator which is displaced from the operating position corresponding to the geared neutral point in a direction represented by the range selected by the selector lever, and which corresponds to a boundary part of the hysteresis region; and engage the clutch after the operation position of the actuator has been changed to the predetermined position.

8. The speed change controller as defined in claim 7, the microprocessor is further programmed to engage the clutch after changing the operating position of the actuator to a position which is further displaced from the predetermined position in the direction represented by the range selected by the selector lever.

9. A speed change controller for an infinite speed ratio transmission for a vehicle, the infinite speed ratio transmission comprising an input shaft, a continuously variable transmission which transmits a rotation speed of the input shaft to a first output shaft at an arbitrary speed ratio, a fixed speed ratio transmission which transmits the rotation speed of the input shaft to a second output shaft at a fixed speed ratio, a planetary gear set comprising a first rotation element joined to the first output shaft, a second rotation element, and a third rotation element which varies a rotation direction and a rotation speed according to a difference of a rotation speed of the first rotation element and a rotation speed of the second rotation element, and a clutch joining the second output shaft and second rotation element, the controller comprising:

a selector lever which selects one of a stationary range, forward motion range and reverse motion range;

a sensor which detects a range selected by the selector lever;

an actuator which varies the speed ratio of the continuously variable transmission according to an operating position, the operating position having a hysteresis region with respect to the speed ratio of the continuously variable transmission according to a transmission torque of the continuously variable transmission; and a microprocessor programmed to:

determine whether or not the range selected by the selector lever has changed from the stationary range to one of the forward motion range and reverse motion range; and change the operation position of the actuator to a predetermined position when the range selected by the selector lever has changed from the stationary range to one of the forward motion range and reverse motion range, wherein the predetermined position corresponds to an operating position of the actuator corresponding to the geared neutral point in a state where a torque transmitted by the continuously variable transmission is increased.

10. The speed change controller as defined in claim 9, wherein the predetermined position corresponds to outside or to a boundary part of the hysteresis region.

* * * * *